(12) United States Patent
Reid, III et al.

(10) Patent No.: US 9,703,675 B2
(45) Date of Patent: Jul. 11, 2017

(54) STRUCTURED LOGGING AND INSTRUMENTATION FRAMEWORK

(71) Applicant: MICROSOFT CORPORATION, Redmond, WA (US)

(72) Inventors: Charles Marcus Reid, III, Kirkland, WA (US); Molly Grossman, Redmond, WA (US); Bin Zhao, Bellevue, WA (US); Jacob Pitts, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 108 days.

(21) Appl. No.: 14/456,402

(22) Filed: Aug. 11, 2014

(65) Prior Publication Data

US 2016/0041894 A1 Feb. 11, 2016

(51) Int. Cl.
*G06F 9/44* (2006.01)
*G06F 11/36* (2006.01)

(52) U.S. Cl.
CPC .................. *G06F 11/3636* (2013.01)

(58) Field of Classification Search
CPC .......................... G06F 11/3636; G06F 11/3644
See application file for complete search history.

(56) References Cited

U.S. PATENT DOCUMENTS

| | | | | |
|---|---|---|---|---|
| 6,802,054 | B2 * | 10/2004 | Faraj | G06F 11/3636 714/45 |
| 7,512,954 | B2 * | 3/2009 | Srivastava | G06F 9/546 714/45 |
| 7,685,143 | B2 | 3/2010 | Tsui et al. | |
| 7,721,266 | B2 | 5/2010 | Frey et al. | |
| 7,941,438 | B2 * | 5/2011 | Molina-Moreno | G06F 8/35 707/756 |
| 2002/0174082 | A1 * | 11/2002 | Miloushev | G06F 8/36 706/47 |
| 2004/0167912 | A1 * | 8/2004 | Tsui | G06F 17/3089 |
| 2005/0091373 | A1 * | 4/2005 | Ciapala | G06F 11/3636 709/224 |
| 2005/0223283 | A1 * | 10/2005 | Frey | G06F 11/366 714/20 |
| 2006/0156064 | A1 * | 7/2006 | Damani | G06F 11/1471 714/16 |

(Continued)

OTHER PUBLICATIONS

Szorc, Gregory, "Thoughts on Logging—Part 1—Structured Logging", available at: <<http://gregoryszorc.com/blog/category/logging/>>, Dec. 6, 2012, 5 pages.

(Continued)

*Primary Examiner* — Chameli Das

(57) ABSTRACT

A structured logging and instrumentation framework may include a structured logging service that interacts with one or more instrumentation points of an application at runtime. The structured logging service may expose a structured logging application programming interface that may be called by an instrumentation point for passing structured trace event information. The structured logging service may be implemented as a source of structured trace event information for one or more consumers and may output structured trace event information as a serialized string or as one or more strongly-typed key-value pairs.

20 Claims, 9 Drawing Sheets

(56) References Cited

U.S. PATENT DOCUMENTS

| | | | | |
|---|---|---|---|---|
| 2006/0167817 | A1* | 7/2006 | Gajjala | G06F 21/10 705/59 |
| 2007/0273921 | A1* | 11/2007 | Yamakawa | G06K 15/02 358/1.15 |
| 2007/0288520 | A1* | 12/2007 | Hatanaka | G06Q 10/06 |
| 2009/0138858 | A1* | 5/2009 | Livshits | G06F 11/3419 7/130 |
| 2010/0306590 | A1* | 12/2010 | Anand | G06F 11/3692 714/32 |
| 2011/0320878 | A1* | 12/2011 | Rosu | G06F 11/302 714/38.1 |
| 2014/0105009 | A1* | 4/2014 | Vos | H04W 28/0268 370/230 |
| 2015/0180839 | A1* | 6/2015 | Moffat | H04L 63/08 713/150 |
| 2015/0309921 | A1* | 10/2015 | Smith | G06F 21/00 717/131 |
| 2016/0055225 | A1* | 2/2016 | Xu | G06F 17/30575 707/624 |

OTHER PUBLICATIONS

Morrison, Vance, "More Support for EventSource and Strongly Typed Logging: The Semantic Logging Application Block", available at: <<http://blogs.msdn.com/b/vancem/archive/2013/03/09/more-support-for-eventsource-and-strongly-typed-logging-the-semantic-logging-application-block.aspx>>, Mar. 9, 2013, 3 pages.

Apache Software Foundation, "Apache log4net™ Manual—Contexts", available at: <<http://logging.apache.org/log4net/release/manual/contexts.html>>, Nov. 18, 2013, 3 pages.

Balakrishnan, et al., "CORFU: A Shared Log Design for Flash Clusters", In Proceedings of 9th USENIX Symposium on Networked Systems Design and Implementation, Apr. 25, 2012, 14 pages.

Apache Software Foundation, "Apache Flume™—Flume 1.5.0 User Guide", retrieved from: <<https://flume.apache.org/FlumeUserGuide.html>> on Jun. 3, 2014, 39 pages.

Microsoft Corporation, "6—Logging What You Mean: Using the Semantic Logging Application Block", retrieved from: <<http://msdn.microsoft.com/en-us/library/dn440729(v=pandp.60).aspx>> on Jun. 3, 2014, 30 pages.

structuredlogs.com, "Structured Log Testing", available at: <<http://structuredlogs.com/about/>>, May 22, 2009, 3 pages.

Microsoft Corporation, "Using the Trace Logging API", available at: <<http://msdn.microsoft.com/en-us/library/office/ff512746(v=office.14).aspx>>, May 2010, 1 page.

Querna, Paul, "Write Logs for Machines, use JSON", available at: <<https://journal.paul.querna.org/articles/2011/12/26/log-for-machines-in-json/>>, Dec. 26, 2011, 4 pages.

* cited by examiner

STRUCTURED LOGGING AND INSTRUMENTATION FRAMEWORK

BACKGROUND

When developing or debugging an application, a developer may employ logging mechanisms such as Unified Logging System (ULS) or Event Tracing for Windows (ETW) when writing to a log file stored in a file system. A log file typically includes a vast number of log messages, and each log message contains information that can be viewed by a developer to diagnose and correct problems that have occurred. Log files may be opened and read by a developer using a text editor or log viewer application.

A developer may write to a log file using a trace writing method such as: WriteTrace(System.UInt32, Microsoft.SharePoint.Administration.SPDiagnosticsCategory, Microsoft.SharePoint.Administration.TraceSeverity, System.String, System.Object[ ]);. When using the trace writing method, the developer often will provide a string containing formatting placeholders so that the string is passed to System. String.Format(string, Object[ ]) for formatting.

Developers conventionally use print-formatted (printf) style string logging to create log files. Printf-based string logging allows developers to create free form log messages that include message text and formatting placeholders (e.g., % d, % s, etc.) which are replaced by values of variables when a printf statement is executed.

Since the content of each individual log message is free form, log files tend to lack consistency. The lack of consistency within a log file makes it more difficult for a developer to read the log file and locate necessary information. When searching for information pertaining to a certain problem, a developer often may have to perform a regular expression (regex) search on the message strings to determine which logs are of interest and then will have to search again within the logs of interest to extract the necessary information. The lack of consistency within a log file and the lack of consistency among log files also make it difficult to design computer programs for analyzing log files and to do broad log analysis with machines.

Moreover, creating string-based logs negatively impacts the performance of an application. Namely, generating a large log file for an application involves the use and consumption of important computing, processing, and/or storage resources.

SUMMARY

The following summary is provided to introduce a selection of concepts in a simplified form that are further described below in the detailed description. This summary is not intended to identify key features or essential features of the claimed subject matter, nor is it intended to be used to limit the scope of the claimed subject matter.

In various implementations, a structured logging and instrumentation framework may include a structured logging service that interacts with one or more instrumentation points of an application at runtime. The structured logging service may expose a structured logging application programming interface that may be called by an instrumentation point for passing trace event arguments that supply structured trace event information. The structured logging application programming interface may include a function that is structured to accept trace event parameters having various data types including one or more strongly-typed key-value pairs.

The structured logging service may be implemented as a source of structured trace event information for one or more consumers, such as a disk log sink and a rules engine. The disk log sink may be selectively enabled to consume structured trace event information for output to a trace log that is stored as a log file on disk or other storage location.

The structured logging application programming interface exposed by the structured logging service may receive structured trace event information as one or more strongly-typed key-value pairs, as opposed to a print-formatted string. The structured logging service may be configured to automatically serialize the strongly-typed key-value pairs and output a serialized string for consumption by the disk log sink. The serialized string may be provided in a format that is both human-readable and machine-readable.

The structured logging service may be configured to output the strongly-typed key-value pairs for consumption by the rules engine without performing serialization. Accordingly, the performance overhead of string serialization may be avoided when providing structured trace event information to the rules engine and/or when the disk log sink is not enabled. The rules engine may be configured to target certain items of structured trace event information at runtime by applying consumption rules to the strongly-typed key-value pairs received from the structured logging service.

These and other features and advantages will be apparent from a reading of the following detailed description and a review of the appended drawings. It is to be understood that the foregoing summary, the following detailed description and the appended drawings are explanatory only and are not restrictive of various aspects as claimed.

DETAILED DESCRIPTION

The detailed description provided below in connection with the appended drawings is intended as a description of examples and is not intended to represent the only forms in which the present examples may be constructed or utilized. The description sets forth functions of the examples and sequences of steps for constructing and operating the examples. However, the same or equivalent functions and sequences may be accomplished by different examples.

References to "one embodiment," "an embodiment," "an example embodiment," "one implementation," "an implementation," "one example," "an example" and the like, indicate that the described embodiment, implementation or example may include a particular feature, structure or characteristic, but every embodiment, implementation or example may not necessarily include the particular feature, structure or characteristic. Moreover, such phrases are not necessarily referring to the same embodiment, implementation or example. Further, when a particular feature, structure or characteristic is described in connection with an embodiment, implementation or example, it is to be appreciated that such feature, structure or characteristic may be implemented in connection with other embodiments, implementations or examples whether or not explicitly described.

Numerous specific details are set forth in order to provide a thorough understanding of one or more aspects of the described subject matter. It is to be appreciated, however, that such aspects may be practiced without these specific details. While certain components are shown in block diagram form to describe one or more aspects, it is to be understood that functionality performed by a single component may be performed by multiple components. Similarly, a single component may be configured to perform functionality described as being performed by multiple components.

Various aspects of the subject disclosure are now described in more detail with reference to the drawings, wherein like numerals generally refer to like or corresponding elements throughout. The drawings and detailed description are not intended to limit the claimed subject matter to the particular form described. Rather, the intention is to cover all modifications, equivalents and alternatives falling within the spirit and scope of the claimed subject matter.

Figure 1:
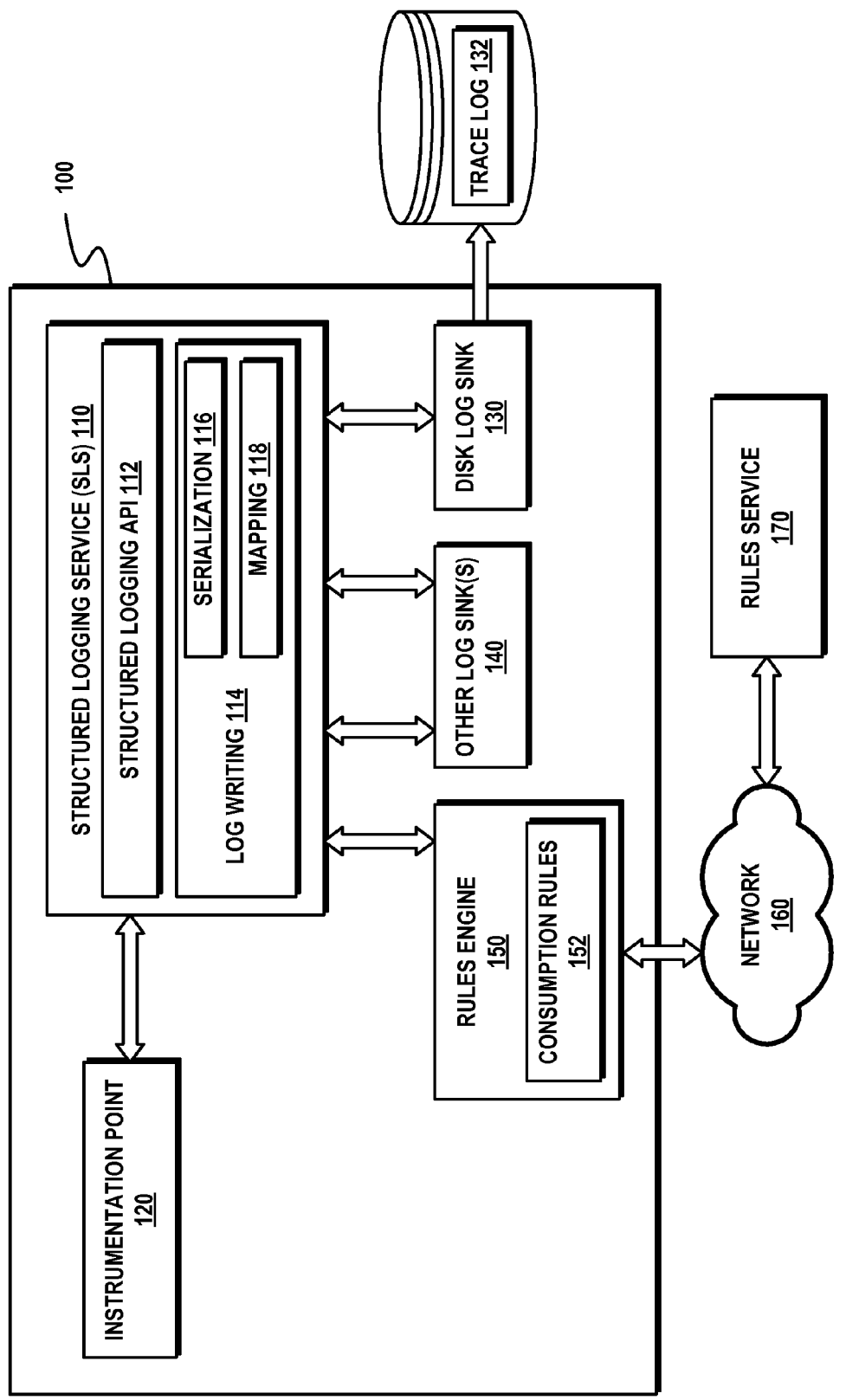
FIG. 1 illustrates an embodiment of an exemplary framework that may implement aspects of the described subject matter.

FIG. 1 illustrates a structured logging and instrumentation framework 100 as an embodiment of an exemplary framework that may implement aspects of the described subject matter. Embodiments of structured logging and instrumentation framework 100 may be described in the general context of "computer-executable instructions" that are executed to perform various steps, methods, and/or functionality in accordance with aspects of the described subject matter.

Computer-executable instructions may be embodied and/or implemented in various ways such as by a computer program (e.g., client and/or server programs), a software application (e.g., client and/or server applications), software code, application code, source code, executable files, executable components, program modules, routines, application programming interfaces (APIs), functions, methods, objects, properties, data structures, data types, and/or the like.

Computer-executable instructions implemented by structured logging and instrumentation framework 100 may be executed, for example, by one or more computing devices and/or computer systems that may include one or more processors and storage devices (e.g., memory and disk drives) as well as various input devices, output devices, communication interfaces, and/or other types of devices. Computer-executable instructions implemented by structured logging and instrumentation framework 100, when executed by a computing device, computer system, and/or processor, may perform particular tasks or implement particular data types in accordance with aspects of the described subject matter.

Structured Logging Service (SLS)

As shown, structured logging and instrumentation framework 100 may include a structured logging service (SLS) 110. In various implementations, SLS 110 may be configured to report structured trace event information corresponding to one or more trace events that occur in an application at runtime. SLS 110 may be implemented for and/or by an application in various contexts such as application development scenarios, debugging scenarios, testing scenarios, error reporting scenarios, production scenarios, telemetry scenarios, and/or other types of event notification scenarios. SLS 110 may be implemented for and/or by an application, one or more components within an application, and/or groups of applications.

When enabled, SLS 110 may receive structured trace event information corresponding to one or more trace events that occur in an application at runtime. In one implementation, an application may include various instrumentation points, such as instrumentation point 120, from which SLS 110 may receive structured trace event information.

In order to trace an application, component, and/or process, a developer may define and/or designate various instrumentation points in the application (e.g., within application source code) by implementing instrumentation code that is configured to raise a trace event at a certain stage of execution and/or in response to certain application conditions. It is to be appreciated that when writing code for a particular area of an application, a developer may insert numerous instrumentation points for sending various types of structured trace event information and that instrumentation point 120 is shown as an example of one of such instrumentation points. For instance, when instrumentation point 120 is encountered during execution, a trace event may be triggered causing structured trace event information corresponding to the trace event to be sent to SLS 110 for reporting.

SLS 110 may report structured trace event information that may include various types of data and metadata related to the performance of an application during execution. For instance, the structured trace event information may include performance data and metadata related to the state of an application, one or more application components, and/or one or more processes at various stages of execution and/or when interacting with other local and/or remote applications, components, and/or processes.

Examples of structured trace event information include, without limitation: trace event time, trace event location, process data, thread data, category data, event identifier, severity level, correlation data, message data, error data, logical operation data (e.g., start, suspend, resume, and/or transfer), command execution data, input event data, request data, progress data, response data, session data, counter data, quality data, application usage data, feature usage data, resource usage data, version data, anonymized user/customer data, device data, platform data, operating system data, and/or other types of statistics in accordance with the described subject matter.

In certain contexts (e.g., development, debugging, testing) that typically occur prior to deployment, SLS 110 may report structured trace event information as diagnostic data for use by a developer and/or system administrator to investigate and troubleshoot issues, debug code, verify completion of tasks, monitor and measure application performance, and/or test an application for release. In other contexts (e.g., testing, error reporting, production, telemetry) that may occur after deployment, SLS 110 may report structured trace event information as telemetry data for local and/or remote analysis to diagnose and correct problems, evaluate application performance and usage, and/or provide product improvement.

In various implementations, SLS 110 may operate as a common logging service and source of structured trace event information for one or more consumers of structured trace event information. As shown, exemplary consumers of structured trace event information may include one or more of: a disk log sink 130, other log sink(s) 140, and a rules engine 150. When implemented, disk log sink 130, other log sink(s) 140, and/or rules engine 150 may be configured to register with SLS 110 to receive structured trace event information.

It is to be understood that some implementations may not include all of the illustrated consumers of structured trace event information. It is also to be understood that some implementations may include additional and/or different types of consumers of structured trace event information. Moreover, in the interests of user/customer privacy and information protection, each implemented provider and consumer of structured trace event information may employ various mechanisms to control the monitoring, collection, reporting, and/or retention of sensitive data. Such mechanisms may include, without limitation: requiring authorization to monitor, collect, or report data; enabling users and customers to opt in and opt out of data monitoring, collecting, and reporting; employing privacy rules to prevent certain data from being monitored, collected, or reported; providing functionality for anonymizing, truncating, or obfuscating sensitive data which is permitted to be monitored, collected, or reported; employing data retention policies for protecting and purging data; and so forth.

Disk log sink 130 may be implemented to consume structured trace event information received from SLS 110. In various implementations, outputting structured trace event information to disk log sink 130 may be selectively enabled. When enabled, disk log sink 130 may consume structured trace event information for output to a trace log 132, which may be stored as a log file on disk or other storage location (e.g., database, table storage, blob storage, cloud storage, etc.). Trace log 132 and/or log entries therein generally may include various data fields for presenting items of structured trace event information in human-readable form for review and analysis by an application developer, system administrator, customer service provider, and/or other type of data analyst.

It can be appreciated that outputting structured trace event information to trace log 132 may use and consume important computing, processing, and/or storage resources. As such, outputting to disk log sink 130 may be selectively enabled for some contexts (e.g., development, debugging, testing, error reporting) and disabled for other contexts (e.g., production and telemetry). For example, when an application is deployed to a customer, the functionality for outputting to disk log sink 130 may be provided and implemented but may be disabled by default.

Furthermore, when outputting to disk log sink 130 is enabled, SLS 110 and/or disk log sink 130 may be configured and/or controlled to reduce usage and consumption of computing, processing, and/or storage resources. For example, settings for the storage location, storage duration, and size limit of log files may be configured and/or controlled to preserve resources. In addition, SLS 110 and/or disk log sink 130 may be configured and/or controlled via filtering mechanisms that require structured trace event information to meet certain criteria (e.g., category and/or severity level) in order to be consumed and/or output to trace log 132 for storage.

Other log sink(s) 140 may be implemented to consume structured trace event information received from SLS 110. Other log sink(s) 140 may be implemented, for example, by a custom logger (e.g., custom server logger), a custom listener (e.g., custom program or script), a runtime interface (e.g., plug-in interface), and/or other type of extensibility point for SLS 110.

In various implementations, outputting structured trace event information from SLS 110 to other log sink(s) 140 may be selectively implemented and/or enabled for certain contexts. In some cases, for example, outputting to other log sink(s) 140 may be restricted to use during development and employed to obtain additional output runs for analysis and testing. In such cases, the functionality for outputting to other log sink(s) 140 may be provided to developers but omitted when an application is deployed to a customer. In other cases, the functionality for outputting to other log sink(s) 140 may be implemented in production scenarios but may require user/customer enablement and authorization to consume structured trace event information for output. In addition, SLS 110 and/or other disk log sink(s) 140 may be configured and/or controlled via filtering mechanisms that require structured trace event information to meet certain criteria in order to be consumed and/or output.

Rules Engine

Rules engine 150 may be implemented to consume structured trace event information received from SLS 110. Rules engine 150 may provide dynamic telemetry collection across one or more applications to enable near real-time insight into the operation, usage, and performance of one or more applications and/or services. In various implementations, rules engine 150 may operate to receive structured trace event information from SLS 110 in contexts that occur before and/or after application deployment. For example, SLS 110 may output structured trace event information as telemetry data to be inspected and/or consumed by rules engine 150 at runtime as an application is being developed and after the application has been deployed to a customer.

Rules engine 150 may communicate via a network 160 with a rules service 170. Network 160 may be implemented by any type of network or combination of networks suitable for communication between rules engine and rules service 170. Network 160 may include, without limitation: a wide area network (WAN) such as the Internet, a local area network (LAN), a private network, a public network, a packet network, a circuit-switched network, a wired network, and/or a wireless network. Rules engine 150 may be configured to receive consumption rules 152 from rules service 170 and provide telemetry data to rules service 170 for remote analysis. Rules engine 150 may efficiently transmit telemetry data in a format that is compact over network 160.

Rules service 170 may be configured to provide consumption rules 152 to rules engine 150, receive telemetry data from rules engine, and perform remote analysis on telemetry data. Rules service 170 may target and distribute consumption rules 152 to particular set or subset of a production user base, a particular application or group of applications, a particular platform or set of platforms, and so forth. Consumption rules 152 may be rapidly deployed and/or dynamically changed by rules service 170 without necessitating client code changes.

Rules engine 150 may implement consumption rules 152 for providing dynamic, rules-based telemetry collection and event processing. In various implementations, consumption rules 152 may be utilized by rules engine 150 to determine whether and how structured trace event information is to be consumed. Consumption rules 152 may specify targeting criteria for requesting and/or collecting items of structured trace event information (e.g., telemetry data) at any given point in time. The targeting criteria may have various granularities and define a scope for collecting telemetry data that identifies the properties of structured trace event information which are of interest to rules engine 150, the timing and duration of collection, conditions for collection, and so forth.

Consumption rules 152 may specify one or more actions that rules engine 150 may take with respect to collected items of structured trace event information. Actions that rules engine 150 may take include, without limitation: communicating certain collected items to rules service 170 as telemetry data, analyzing certain collected items, performing one or more calculations on certain collected items, generating rule results based on analysis and/or calculations performed, communicating rule results to rules service 170 as telemetry data, taking one or more actions based on generated rule results, and/or other types of actions. Rules engine 150 may apply consumption rules 152 to structured trace event information supplied by multiple instrumentation points for generating rule results based on complex event processing such as filtering, calculation, aggregation, grouping, joins, and projecting new output events. Rules service 170 may be configured to perform sophisticated event processing using various artificial intelligence and/or machine learning techniques to improve product performance based on the telemetry data.

In various implementations, the functionality for outputting structured trace event information from SLS 110 to rules engine 150 may be implemented in production scenarios (e.g., within a client application, on a customer machine, etc.) and may require user/customer authorization and/or enablement. For example, user/customer authorization and/or enablement of rules engine 150 may be requested and required with respect to: the types of telemetry data that may be monitored, collected, and reported by SLS 110 and rules engine 150; the manner in which telemetry data may be monitored, collected, and reported by SLS 110 and rules engine 150; the actions that rules engine 150 may take on telemetry data; permitted uses of collected telemetry data; retention of collected telemetry data; and so forth.

Consumption rules 152 may be employed by rules engine 150 for providing near real-time monitoring, analysis, and notification for trace events that occur in an application. When enabled and authorized, rules engine 150 may consume structured trace event information corresponding to trace events that occur in an application at runtime when various instrumentation points are encountered. It can be appreciated that instrumentation points may be defined within application source code by a developer during development for use in pre-deployment scenarios. As such, instrumentation points may be designed and/or configured to report in-depth structured trace event information for debugging and testing purposes. It also can be appreciated that while reporting certain data may be appropriate and necessary in a development context, the reporting of such data may not be appropriate and necessary in other contexts (e.g., production, telemetry). This important privacy concern is addressed by consumption rules 152 (e.g., targeting criteria) which enable rules engine 150 to request, select, and receive data that is appropriate for a given context without requiring code changes to instrumentation point 120. As such, the same version of instrumented source code may be used for developers and customers.

Structured Logging Application Programming Interface (API)

SLS 110 may interact with instrumentation point 120 to receive structured trace event information. SLS 110 may be configured to interact with instrumentation point 120 by exposing a structured logging application programming interface (API) 112 that may be called by instrumentation point 120. In various implementations, structured logging API 112 may be called by instrumentation point 120 (e.g., from a logging statement and/or function call implemented by instrumentation code) for passing trace event arguments that supply structured trace event information to SLS 110. The structured trace event information may correspond to one or more trace events that occur in an application at runtime when instrumentation point 120 is encountered.

Structured logging API 112 may implement and/or expose functions for performing tasks. In various implementations, structured logging API 112 may implement and/or expose a function for sending structured trace event information. The function for sending structured trace event information may be called by instrumentation point 120 to pass in trace event arguments to SLS 110. The function may implement trace event parameters having various data types including one or more strongly-typed key-value pairs and may be structured to accept trace event arguments for (or as instances of) such trace event parameters. The function also may avoid the use of a print-formatted (e.g., printf) string.

In one exemplary implementation, a function for sending structured trace event information (e.g., SendStructuredTraceTag( ) method) via structured logging API 112 may be structured to accept a set of trace event arguments corresponding to a set of trace event parameters including: a trace tag parameter (e.g., traceTag), a trace category parameter (e.g., traceCategory), a trace severity parameter (e.g., traceSeverity), a label parameter (e.g., label), and one or more strongly-typed key-value pairs (e.g., (key1,val1), (key2,val2) . . . ) for a structured payload. In this exemplary implementation, structured logging API 112 may provide a data structure and/or method signature such as:

```
void SendStructuredTraceTag(
    uint traceTag,
    TraceCategory traceCategory,
    TraceSeverity traceSeverity,
    string label,
    (string key1, val1),
    (string key2, val2), ...)
```

The trace tag parameter (e.g., traceTag) may accept an identifier (e.g., trace tag ID) for a trace event and may be implemented by a data type such as an unsigned integer. The trace tag parameter may be utilized, for example, to supply a reference (e.g., unique alphanumeric identifier) that corresponds to a specific location (e.g., file line position) in the source code of an application. In various scenarios or contexts, a unique identifier supplied for the trace tag parameter may be used to target a specific code location (e.g., location of instrumentation point 120) when a trace event is triggered.

The trace category parameter (e.g., traceCategory) may accept a category (e.g., category name or category ID) for a trace event and may be implemented by various data types and/or classes (e.g., TraceCategory). The trace category parameter may be utilized, for example, to supply a category such as an area or feature of an application and/or product. Areas or features may be selected from predefined categories and/or may be supplied as a desired or custom category for the trace category parameter when calling structured logging API 112. Examples of categories include, without limitation: user interface, layout, file open, test, web front end, administration, request processing, query processing, search, e-mail, load balancing, setup, upgrade, topology, monitoring, usage, and/or other types of areas or features having various granularities.

The trace severity parameter (e.g., traceSeverity) may accept a severity level (e.g., trace level, event level) for a trace event and may be implemented by various data types and/or classes (e.g., TraceSeverity). The trace severity parameter may be utilized, for example, to supply a diagnostic level such as error, warning, information (info), or verbose. In some cases, the diagnostic level may be associated with a trace category or sub-category. In various scenarios or contexts, a diagnostic level supplied for the trace severity parameter may be used for determining whether and/or how structured trace event information is reported by SLS 110. It is to be understood that additional diagnostic levels may be supported including higher levels (e.g., critical, crash, fatal, etc.), which are more severe than error, and lower levels (e.g., spam, start, stop, suspend, resume, transfer, etc.), which are more chatty than verbose. It is also to be understood that alternative diagnostic levels (e.g., unexpected, monitorable, high, medium, or verbose) and/or custom diagnostic levels may be supported.

The label parameter (e.g., label) may accept a message (e.g., text-only message string) and may be implemented by a data type such as a string. The label parameter may be utilized, for example, to supply a message that describes the nature of a trace event. In various scenarios or contexts, a message supplied by the label parameter may be used to convey a developer-defined static description of a trace event that may be reviewed in a log file. It is to be appreciated that the label parameter is not implemented as a print-formatted (e.g., printf) string and does not contain any variable parameters or formatting placeholders. In various implementations, the label parameter may be restricted from receiving a print-formatted (e.g., printf) string, variable parameters, and formatting placeholders. Examples of a message supplied to label parameter may include, without limitation: operation started, operation completed, operation succeeded, error occurred, failed to open file, request issued, request redirected, response received, and/or other types of trace event descriptions.

The one or more strongly-typed key-value pairs (e.g., (key1,val1), (key2,val2) . . . ) may accept a structured payload including various items of structured trace event information. The strongly-typed key-value pairs may be implemented by various data types supported and/or defined by structured logging API 112. Each strongly-typed key-value pair may be utilized, for example, to supply a key and a value for an item of structured trace event information.

In one implementation, each key supplied for the one or more strongly-typed key-value pairs may be required to be a unique and valid string. For example, each key provided in a call to structured logging API 112 may be required to be unique with respect to any other key or argument supplied in the call. Each key also may be required to begin with a letter or underscore, followed by zero or more letters, digits, or an underscore in order to be valid. That is, in order to be valid, each key supplied in a series of key-value pairs may be required to be both unique and match the regular expression (regex): /[a-zA-Z_][a-zA-Z0-9_]*/.

Structured logging API 112 may support various data types for values in the strongly-typed key-value pairs. In one implementation, the data types for key-value pair values may correspond to data types which are valid for a particular consumer of structured trace event information. For instance, a set of data types which is valid for rules engine 150 may be used as the set of data types which is valid for key-value pair values. In one implementation, structured logging API 112 and rules engine 150 may accept: int8, int16, int32, int64, uint8, uint16, uint32, uint64, bool, float, and double as valid number types and may accept: Ansi text, wide text, GUID, filetime, and systemtime as valid non-number types. It is to be understood that equivalent types may be accepted on platforms for which one or more of the foregoing data types are inapplicable.

Structured logging API 112 may be overloaded to support and allow a range of numbers of strongly-typed key-value pairs to be passed in. In some implementations, the number of key-value pairs supported by structured logging API 112 may be limited by the maximum length of a trace event message (e.g., maximum string content length quota 8192, maximum serialized line length 2048, etc.) and/or bandwidth considerations. Structured logging API 112 typically may accommodate a large number (e.g., >100) key-value pairs for every trace event message. If the number of key-value pairs supplied would exceed the maximum length of a trace event message, an alert or error may be generated. Alternatively, in some implementations, structured logging API 112 may include logic and/or functionality for automatically generating a new string or data structure for the trace event message that can accommodate the supplied number of key-value pairs. In such implementations, structured logging API 112 effectively may impose no limit on the number of key-value pairs.

In one or more implementations, an additional overload of structured logging API 112 may allow a collection of key-value pairs to be passed in instead of a series of key-value pairs. For instance, a collection overload may be used in the event that a logging statement and/or trace event message requires more than a certain number (e.g., 50) of key-value pairs, provided that the serialized line length does not exceed the maximum. In such implementations, structured logging API 112 may provide a data structure and/or method signature such as:

```
void SendStructuredTrace(
    uint traceTag,
    TraceCategory traceCategory,
    TraceSeverity traceSeverity,
    string label,
    collection keyValPairs)
```

A key-value pair collection (e.g., keyValPairs) may be used in scenarios where the number of needed key-value pairs is more than explicitly supported and/or where a particular platform is unable to use inline key-value pair overloads. Before the collection version of structured logging API 112 is called to create the collection of key-value pairs, a preliminary function (e.g., ShouldTrace method) may be called in order to avoid creation of objects which may not be used. If a logging statement that is longer than the maximum serialized line length is desired, a developer may employ multiple logging statements.

It is to be understood that structured logging API 112 may be implemented in various ways and that the exemplary functions, method signatures, parameters, and/or arguments described herein are not intended to limit the described subject matter to particular implementations.

Calling Structured Logging API

Instrumentation point 120 may be configured to call structured logging API 112 for passing trace event arguments that supply structured trace event information to SLS 110. For example, instrumentation point 120 may implement executable code (e.g., API call, function call, logging statement, etc.) configured to call structured logging API with trace event arguments. The structured trace event information may correspond to one or more trace events that occur in an application at runtime when instrumentation point 120 is encountered.

In various implementations, instrumentation point 120 may call a function for sending structured trace event information (e.g., SendStructuredTraceTag( ) method) that is exposed by structured logging API 112. Instrumentation point 120 may provide trace event arguments for (or as instances of) trace event parameters supported by the function. The trace event arguments may have various data types and include a structured payload containing one or more strongly-types key-value pairs. The trace event arguments supplied by instrumentation point 120 may avoid the use of a print-formatted (e.g., printf) string.

In one exemplary implementation, instrumentation point 120 may call a function for sending structured trace event information (e.g., SendStructuredTraceTag( ) method) with trace event arguments including: a trace tag argument (e.g., tag_n1bce), a trace category argument (e.g., FileOpen), a trace severity argument (e.g., Error), a label argument (e.g., L"Failed to open file."), and a structured payload including one or more strongly-typed key-value pairs (e.g., StructuredHr(L"errorCode", hr), StructuredWz(L"url", url), . . . ). In this exemplary implementation, instrumentation point 120 may include a logging statement (e.g., function call to method of structured logging API 112) such as:

```
SendStructuredTraceTag(tag_n1bce,
    TraceCategory::FileOpen,
    TraceSeverity::Error,
    L"Tailed to open file.",
    StructuredHr(L"errorCode", hr),
    StructuredWz(L"url", url), ...;
```

The trace tag argument (e.g., tag_n1bce) may be an identifier (e.g., trace tag ID) for a trace event and supply a reference (e.g., unique alphanumeric identifier) that corresponds to a specific location (e.g., file line position) in the source code of an application. In various scenarios or contexts, the trace tag argument may be used to target a specific code location (e.g., location of instrumentation point 120) when a trace event is triggered.

The trace category argument (e.g., FileOpen) may be a category (e.g., category name or category ID) for a trace event and supply a category such as an area or feature of an application and/or product. The trace category argument may be selected from predefined categories and/or may be supplied as a desired or custom category.

The trace severity argument (e.g., Error) may be a severity level (e.g., trace level, event level) for a trace event and supply a diagnostic level. In some cases, the diagnostic level may be associated with the trace category argument. In various scenarios or contexts, the trace severity argument may be used for determining whether and/or how structured trace event information is reported by SLS 110.

The label argument (e.g., L"Failed to open file.") may be a message (e.g., text string) and supply a message that describes the nature of a trace event. In various scenarios or contexts, the label argument may be used to convey a developer-defined static description of a trace event that may be reviewed in a log file. It is to be appreciated that the label argument is not implemented as a print-formatted (e.g., printf) string and does not contain any variable parameters or formatting placeholders.

The one or more strongly-typed key-value pairs (e.g., StructuredHr(L"errorCode", hr), StructuredWz(L"url", url), . . . ) may be a structured payload including various items of structured trace event information implemented by various data types supported by structured logging API 112. Each strongly-typed key-value pair may supply a key (e.g., "errorCode" or "url") and a value (e.g., hr or url) for an item of structured trace event information. Each key may be a unique and valid string. Each value may have a data type that is valid for structured logging API 112 and rules engine 150. In various implementations, structured logging API 112 may require each key-value pair to include an explicit type declaration. In the above example, the strongly-typed key-value pairs include explicit type declarations for structured data types (e.g., StructuredHr, StructuredWz) which are supported by structured logging API 112 and rules engine 150. Type explicitness may be required, for instance, in order to guarantee that the correct data type is selected and provided for output to disk log sink 130 and rules engine 150. It can be appreciated that the syntax requirement of explicit type declarations may clarify the intent of the developer, provide consistency, preserve precision, and avoid data mismatch when performing calculations on multiple collected items of structured trace event information. Failure to comply with the explicit type declarations may produce compile-time breaks if the value does not match the declared data type. In other implementations, implicit or inferred data types may be implemented using a compiler feature such as templates.

Table 1 shows exemplary structured data types and strongly-typed key-value pairs that may be implemented by instrumentation point 120 and may be accepted by structured logging API 112 and rules engine 150. It is to be understood that the following exemplary structured data types and strongly-typed key-value pairs are provided for illustration and are not intended to limit the described subject matter to particular implementations of data types, keys, and/or values.

TABLE 1

| Exemplary Structured Data Type | Exemplary Key-Value Pair |
| --- | --- |
| StructuredInt | (L"int", INT_MIN) |
| StructuredInt8 | (L"int8", static_cast<int8_t> (INT8_MIN)) |
| StructuredInt16 | (L"int16", static_cast<int16_t> (INT16_MIN)) |
| StructuredInt32 | (L"int32", INT32_MIN) |
| StructuredInt64 | (L"int64", INT64_MIN) |
| StructuredUint | (L"uint", UINT_MAX) |
| StructuredUint8 | (L"uint8", UINT8_MAX) |
| StructuredUint16 | (L"uint16", UINT16_MAX) |
| StructuredUint32 | (L"uint32", UINT32_MAX) |
| StructuredUint64 | (L"uint64", UINT64_MAX) |
| StructuredBool | (L"bool", true), |
| StructuredFloat | (L"float", static_cast<float>(3.14)) |
| StructuredDouble | (L"double", 2.863) |

TABLE 1-continued

| Exemplary Structured Data Type | Exemplary Key-Value Pair |
|---|---|
| StructuredString | (L"string", std::string("std::string")) |
| StructuredSz | (L"sz", "sz") |
| StructuredWString | (L"wstring",std::wstring (L"std::wstring")) |
| StructuredWz | (L"wz", L"wz") |
| StructuredGuid | (L"guid", guid) |
| StructuredFileTime | (L"fileTime", fileTime) |
| StructuredSystemTime | (L"systemTime", systemTime) |
| StructuredHr | (L"errorCode", hr) |

During runtime, instrumentation point 120 may raise a trace event and call structured logging API 112 with trace event arguments including a structured payload that contains one or more strongly-typed key-value pairs. In various implementations, the logging statement (e.g., function call to method of structured logging API 112) may immediately fail and assert for error conditions such as: maximum serialized line length exceeded, invalid data type, invalid JSON key name, duplicate keys, unequal number of keys and values. On each successful call to structured logging API 112, instrumentation point 120 may supply SLS 110 with various (and numerous) items of structured trace event information via trace event arguments including a structured payload of strongly-typed key-value pairs.

Calls to structured logging API 112 may be received and handled by SLS 110 for outputting structured trace event information to one or more consumers of structured trace event information such as disk log sink 130, other log sink(s) 140, and rules engine 150. Structured trace event information supplied by various instrumentation points may flow through SLS 110 for delivery to one or more consumers as a stream of structured trace event information. Different types of consumers such as disk log sink 130 and rules engine 150 may listen to the stream of structured trace event information and consume various items of structured trace event information in different ways.

In various implementations, SLS 110 may include a log writing component 114 implemented, for example, by one or more log writers and/or log writer interfaces. In some implementations, log writing component 114 and/or portions thereof may be associated with (or included within) structured logging API 112. Log writing component 114 may be configured to output structured trace event information such as structured payload to one or more destinations in one or more delivery formats. For example, log writing component 114 may output a structured payload as a serialized string to disk log sink 130 and may output the structured payload as strongly-typed key-value pairs to rules engine 150. In implementations having multiple consumers of structured trace event information, log writing component 114 may be configured to multiplex structured trace event information to a plurality of consumers.

When outputting to disk log sink 130 and/or other log sink(s) 140 that consume the structured payload as a serialized string, log writing 114 component may perform string serialization of the strongly-typed key-value pairs contained in the structured payload by employing a serialization component 116. In various implementations, serialization component 116 may be configured to automatically serialize structured trace event information such as the structured payload for output as a serialized string. For example, instrumentation point 120 may be implemented by a logging statement that supplies strongly-typed key-value pairs without supplying a serialization request, statement, command, or call. SLS 110 may automatically create serialized strings when a trace log is to be written in response to logging statements that supply strongly-typed key-value pairs and without requiring such logging statements to include a serialization request, statement, command, or call.

In one implementation, the serialized string may be provided in a format that is both human-readable and machine-readable, such as JSON format or other suitable format. For implementations that employ JSON formatting, serialization component 116 may use one or more JSON dictionaries to serialize strongly-typed key-value pairs contained in the structured payload for output as a JSON-serialized string to be consumed by disk log sink 130. The set of data types supported by JSON dictionaries may include number (int64/double), string, Boolean, and null.

In some implementations, the data types supported by JSON dictionaries may be a subset of the data types supported by rules engine 150. To handle situations when a passed-in data type is valid for rules engine 150 but invalid for a JSON dictionary, log writing component 114 may employ a mapping component 118 to convert the passed-in data type into an to acceptable JSON data type for writing to trace log 132. Mapping component 118 may convert data types for rules engine 150 such as filetime and systemtime to a JSON string data type or a JSON 64-bit integer data type. Mapping component 118 may convert a data type such as GUID to a JSON string data type (e.g., toString with dashes only).

When outputting to rules engine 150 and/or other log sink(s) 140 that consume the structured payload as strongly-typed key-value pairs, log writing component 114 may use the original passed-in data types for the strongly-typed key-value pairs and not employ serialization component 116 and mapping component 118. Accordingly, the performance overhead of string serialization may be avoided when providing structured trace event information to rules engine 150 and/or when disk log sink 130 is not enabled.

When outputting a structured payload to rules engine 150 in a given context, rules engine 150 may be configured to target only certain items of structured trace event information contained in the structured payload which are permissible and necessary for the given context. For instance, in the example above in which the structured payload includes strongly-typed key-value pairs ("errorCode", hr) and ("url", url), the uniform resource locator value (url) is considered sensitive information that is not to be collected as telemetry data. Accordingly, when the structured payload is output and received, rules engine 150 may target and consume the error code value (hr) as telemetry data but will not target and will not consume the uniform resource locator value (url) as telemetry data.

Exemplary Structured Logging Processes

With continuing reference to FIG. 1, exemplary structured logging processes are described below to further illustrates aspects of the described subject matter. It is to be understood that the following exemplary structured logging process are not intended to limit the described subject matter to particular implementations.

Figure 2:
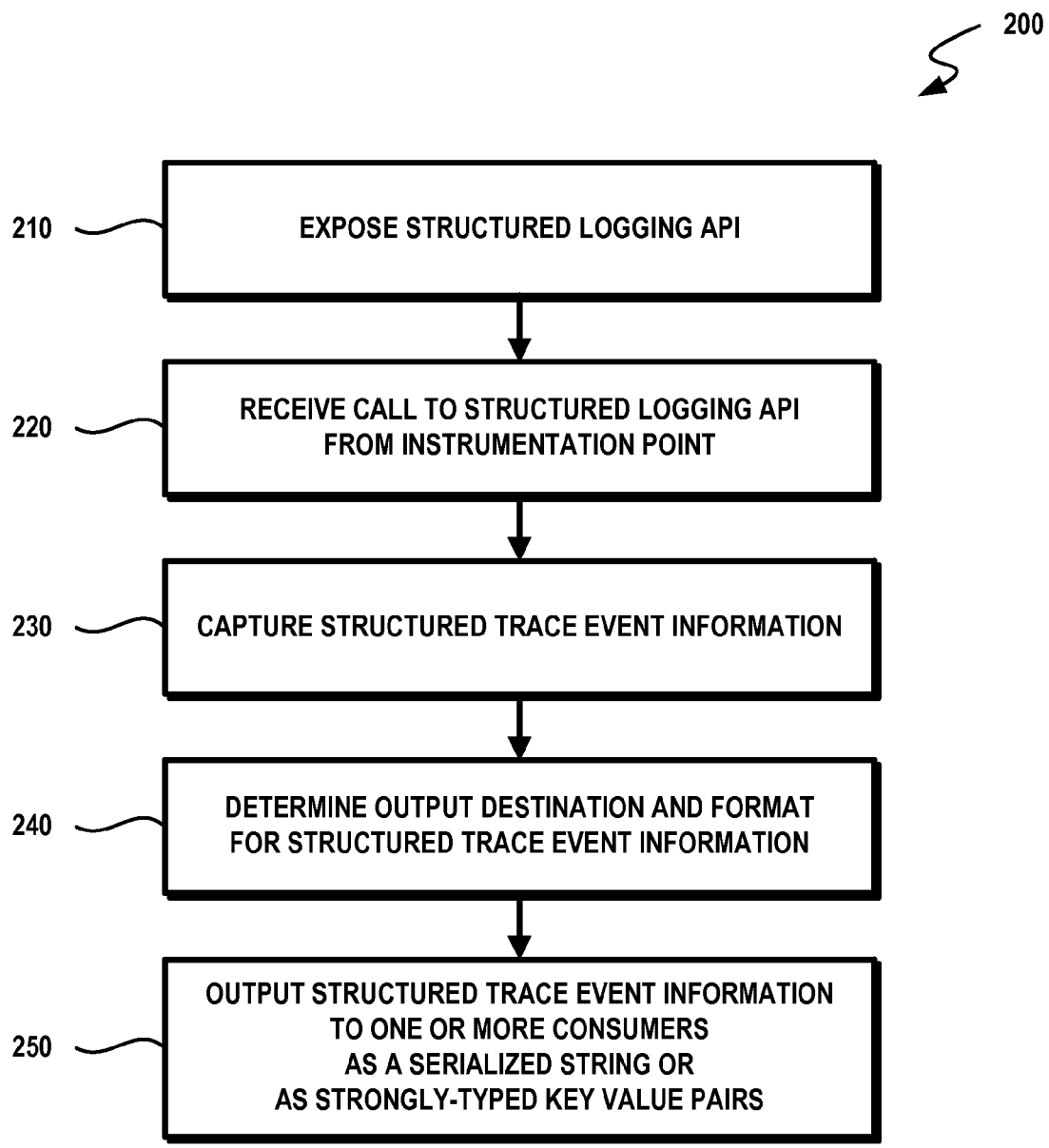
FIG. 2 illustrates an embodiment of an exemplary structured logging process in accordance with aspects of the described subject matter.

FIG. 2 illustrates a computer-implemented method 200 as an embodiment of an exemplary structured logging process in accordance with aspects of the described subject matter. In one implementation, computer-implemented method 200 may be performed by SLS 110. It is to be appreciated that computer-implemented method 200, or portions thereof, may be performed by other components and may be implemented by software, hardware, firmware or a combination thereof in various embodiments.

At 210, SLS 110 may expose structured logging API 112. Structured logging API 112 may be structured to receive structured trace event information corresponding to one or more trace events that occur in an application at runtime when instrumentation point 120 is encountered. Structured logging API 112 may implement and/or expose a function for sending structured trace event information which may be called by instrumentation point 120 to pass in trace event arguments to SLS 110. The function may implement trace event parameters having various data types including one or more strongly-typed key-value pairs and may be structured to accept trace event arguments for (or as instances of) such trace event parameters. Structured logging API 112 may avoid the use of a print-formatted (e.g., printf) string.

At 220, SLS 110 may receive a call to structured API 112 from instrumentation point 120. On each call to structured logging API 112, SLS 110 may receive structure trace event information that is passed in from instrumentation point 120 via trace event arguments including a structured payload of strongly-typed key-value pairs. The structured payload may be implemented by a variable number of strongly-typed key-value pairs, a series of strongly-typed key-value pairs, and/or collection of strongly-typed key-value pairs. The strongly-typed key-value pairs may provide various items of structured trace event information related to the state of an application, one or more application components, and/or one or more processes at various stages of execution and/or when interacting with other local and/or remote applications, components, and/or processes.

At 230, SLS 110 may capture structured trace event information. On each call to structured logging API 112, SLS 110 may capture structured trace event information based on the trace event arguments supplied in the call. A call to structured logging API 112 may pass in trace event arguments including a structured payload implemented as one or more strongly-typed key-value pairs having various structured data types. The captured structured trace event information may include one or more key-value pairs, a series of key-value pairs, one or more structured objects, a tuple of structured objects, data, and/or metadata built from the one or more strongly-typed key-value pairs contained in the structured payload. For example, a structured payload such as StructuredInt(L"Id", 52), StructuredWz(L"Mode", L"Flop") may output a key-value pair and/or structured object of type StructuredInt (structured integer) having a key of "Id" and a value of 52 and a key-value pair and/or structured object of type StructuredWz (structured wide character string) having a key of "Mode" and a value of "Flop".

In addition to the structured payload, a call to structured logging API 112 may pass in other types of trace event arguments such as: a trace tag argument, a trace category argument, a trace severity argument, a label argument, and/or other type of argument. The captured structured trace event information may include one or more key-value pairs, one or more structured objects, data and/or metadata built from such other types of trace event arguments passed in the call.

In some implementations, SLS 110 may automatically associate additional logging information with the captured structured trace event information. Examples of additional logging information may include, without limitation: a timestamp for the trace event, a process identifier (PID) for a process that generated the trace event, a thread identifier (TID) for an executed thread, a product or application name, an event identifier (Event ID) for the trace event, a correlation identifier (Correlation ID) for grouping related events, a deployment, a role, a role instance, and/or other types of logging information. The captured structured trace event information may include one or more key-value pairs, one or more structured objects, data, and/or metadata based on such additional logging information provided by SLS 110.

At 240, SLS 110 may determine an output destination and format for structured trace event information. When structured logging API 112 is called and/or structured trace event information is captured, SLS 110 may determine whether and how captured structured trace event information is to be output to one or more consumers of structured trace event information (e.g., disk log sink 130, other log sink(s) 140, and/or rules engine 150). In various implementations, one or more consumers may be implemented, enabled, and/or registered to consume structured trace event. Different consumers such as disk log sink 130 and rules engine 150 may receive structured trace event information in different delivery formats and consume structured trace event information in different ways. SLS 110 may determine whether a portion of structured trace event information that corresponds to the structured payload is to be formatted for delivery as a serialized string or remain as strongly-typed key-value pairs.

For each call to structured logging API 112, SLS 110 may inform each enabled and/or registered consumer that structured trace event information is available for output. In various implementations, SLS 110 may notify and/or query each enabled and/or registered consumer using the complete set or a subset of captured structured trace event information. For example, SLS 110 may notify each enabled/and registered consumer that structured trace event information having certain properties (e.g., a particular trace category, a particular trace severity, and/or a particular trace tag) is available for output. SLS 110 may query each enabled and/or registered consumer to inquire whether the consumer is interested in the available structured trace event information. SLS 110 may query each enabled and/or registered consumer to inquire how structured trace event information such as the structured payload is to be delivered to the consumer.

When enabled and/or registered, disk log sink 130 may be configured to request and/or receive structured trace event information for certain trace events based on filtering criteria (e.g., minimum severity level threshold, specified category, etc.). For example, disk log sink 130 may respond affirmatively to a query from SLS 110 when properties of the structured trace event information (e.g., trace severity above the minimum severity level, indication of a specified category, etc.) satisfy the filtering criteria. Disk log sink 130 may respond to a query from SLS 110 by requesting structured trace event information such as the structured payload to be delivered as a serialized string.

When enabled and/or registered, other log sink(s) 140 may be configured to request and/or receive structured trace event information for certain trace events based on filtering criteria (e.g., minimum severity level, specified category, etc). Such other log sink(s) 140 may respond affirmatively to a query from SLS 110 when properties of the structured trace event information satisfy the filtering criteria. Such other log sink(s) 140 may respond to a query from SLS 100 by requesting structured trace event information such as the structured payload to be delivered as a serialized string or as strongly-typed key-value pairs, depending upon implementation.

When enabled and/or registered, rules engine 150 may be configured to request and/or receive structured trace event information for certain trace events based on targeting criteria specified by consumption rules 152. Rules engine 150 may respond affirmatively to a query from SLS 110 when properties of the structured trace event information satisfy the targeting criteria specified by consumption rules 152. Rules engine 150 may respond to a query from SLS 100 by requesting structured trace event information such as the structured payload to be delivered as strongly-typed key-value pairs.

At 250, SLS 110 may output structured trace event information to one or more consumers. SLS 110 may output structured trace event information to one or more consumers of structured trace event information such as disk log sink 130, other log sink(s) 140, and rules engine 150. SLS 110 may be configured to output structured trace event information such as a structured payload to one or more destinations in one or more delivery formats.

SLS 110 may output a portion of structured trace event information that corresponds to the structured payload as a serialized string to disk log sink 130 and/or to other log sink(s) 140 that request delivery as a serialized string. When outputting to disk log sink 130, for example, SLS 110 may perform string serialization of the strongly-typed key-value pairs contained in the structured payload and output a serialized string in a format that is both human-readable and machine-readable (e.g., JSON format). In addition to the serialized string for the structured payload, SLS 110 may provide disk log sink 130 with structured trace event information related to other types of trace event arguments (e.g., trace tag, trace category, trace severity, label, etc.) passed in by instrumentation point 120. SLS 110 also may provide disk log sink 130 with structured trace event information related to additional logging information (e.g., PID, TID, product or application name, Event ID, Correlation ID, deployment, role, role instance, etc.) provided by SLS 110.

SLS 110 may output a portion of structured trace event information that corresponds to the structured payload as strongly-typed key-value pairs to rules engine 150 and/or to other log sink(s) 140 that request delivery as strongly-typed key-value pairs. In addition to strongly-typed key-value pairs of the structured payload, SLS 110 may provide rules engine 150 with structured trace event information including one or more key-value pairs, one or more structured objects, data and/or metadata related to other types of trace event arguments (e.g., trace tag, trace category, trace severity, label, etc.) passed in by instrumentation point 120. SLS 110 also may provide rules engine 150 with structured trace event information including one or more key-value pairs, one or more structured objects, data, and/or metadata related to additional logging information (e.g., PID, TID, product or application name, Event ID, Correlation ID, deployment, role, role instance, etc.) provided by SLS 110.

When outputting to rules engine 150, SLS 110 may use the original passed-in data types for the strongly-typed key-value pairs and avoid performing string serialization. It can be appreciated that the processing required for performing string serialization and writing trace log 132 to a log file is expensive in terms of processor work (e.g., serializing and building JSON file in memory, writing bytes, etc.) and resource consumption (e.g., disk space). Such performance overhead may be avoided when providing structured trace event information to rules engine 150 and/or when disk log sink 130 is not enabled.

Furthermore, in situations where no consumer is interested in structured trace event information that is available from SLS 110, such structured trace event information may be discarded. It can be appreciated that numerous instrumentation points may provide a vast amount of available structured trace event information. In scenarios where disk log sink 130 is disabled, for example, the properties of available structured trace event information often may not satisfy the targeting criteria of consumption rules 152. As such, many situations may arise where structure trace event information may be discarded by SLS 110 and/or rules engine 150 to avoid consuming further processing resources.

Figure 3:
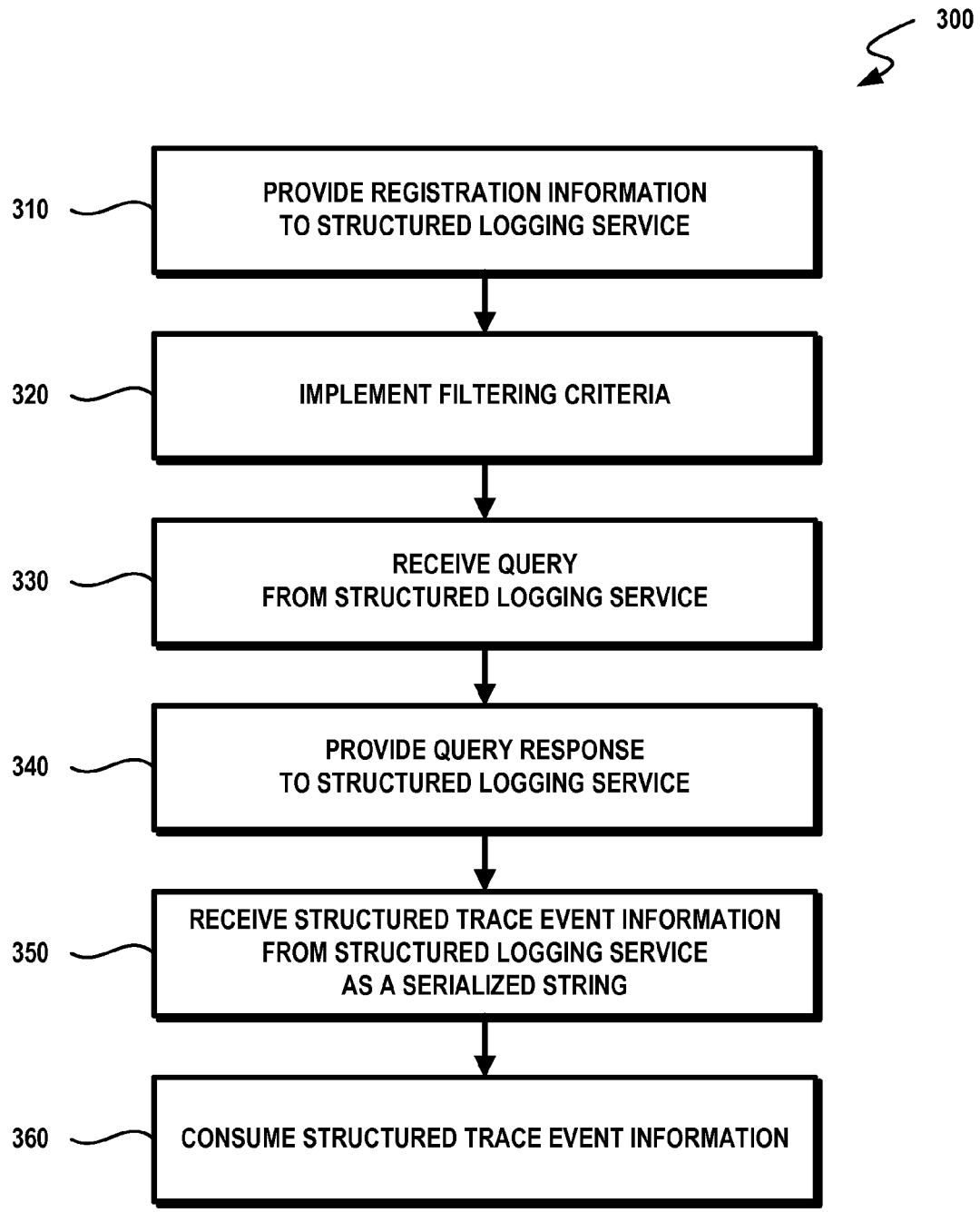
FIG. 3 illustrates an embodiment of an exemplary structured logging process in accordance with aspects of the described subject matter.

FIG. 3 illustrates a computer-implemented method 300 as an embodiment of an exemplary structured logging process in accordance with aspects of the described subject matter. In one implementation, computer-implemented method 300 may be performed by disk log sink 130. It is to be appreciated that computer-implemented method 300, or portions thereof, may be performed by other components and may be implemented by software, hardware, firmware or a combination thereof in various embodiments.

At 310, disk log sink 130 may provide registration information to SLS 110. Disk log sink 130 may register with SLS 110 for enabling disk log sink 130 to received structured trace event information from SLS 110 and/or log writing component 114. Structured trace event information may correspond to one or more trace events that occur in an application at runtime when instrumentation point 120 is encountered. Instrumentation point 120 may include a logging statement (e.g., API call, function call) configured to pass in items of structured trace event information to SLS 110 via trace event arguments. The items of structured trace event information may be related to the state of an application, one or more application components, and/or one or more processes at various stages of execution and/or when interacting with other local and/or remote applications, components, and/or processes.

At 320, disk log sink 130 may implement filtering criteria for receiving structured trace event information. Disk log sink 130 may be configured to request and/or receive structured trace event information for certain trace events based on the filtering criteria (e.g., minimum severity level threshold, specified category, etc.).

At 330, disk log sink 130 may receive a query from SLS 110. The query from SLS 110 may inform disk log sink 130 that structured trace event information is available for output from SLS 110. The query may include a set or a subset of available structured trace event information. For example, the query may notify disk log sink 130 that available structured trace event information having certain properties (e.g., a particular trace category, a particular trace severity, and/or a particular trace tag) may be output. The query may inquire whether disk log sink 130 is interested in the available structured trace event information. The query also may inquire how available structured trace event information such as a structured payload is to be delivered to disk log sink 130.

At 340, disk log sink 130 may provide a query response to SLS 110. Disk log sink 130 may respond affirmatively to a query from SLS 110 when properties of the available structured trace event information (e.g., trace severity above the minimum severity level, indication of a specified category, etc.) satisfy the filtering criteria. Disk log sink 130 may respond to a query from SLS 110 by requesting structured trace event information such as the structured payload to be delivered as a serialized string.

At 350, disk log sink 130 may receive structured trace event information from SLS 110. Disk log sink 130 may receive structured trace event information such as the structured payload as a serialized string. The structured payload may be implemented by a variable number of strongly-typed key-value pairs, a series of strongly-typed key-value pairs, and/or collection of strongly-typed key-value pairs that provide various items of structured trace event information. Strongly-typed key value pairs contained in the structured payload may be serialized and received by disk log sink 130 as a serialized string in a format that is both human-readable and machine-readable (e.g., JSON format).

In addition to the serialized string for the structured payload, disk log sink 130 may receive structured trace event information related to other types of trace event arguments (e.g., trace tag, trace category, trace severity, label, etc.) passed in by instrumentation point 120. Disk log sink 130 also may receive structured trace event information related to additional logging information (e.g., PID, TID, product or application name, Event ID, Correlation ID, deployment, role, role instance, etc.) provided by SLS 110.

At 360, disk log sink 130 may consume structured trace event information. Disk log sink 130 may consume structured trace event information for output to trace log 132, which may be stored as a log file on disk or other storage location (e.g., database, table storage, blob storage, cloud storage, etc.). Trace log 132 and/or trace log entries therein generally may include various data fields for presenting items of structured trace event information in human-readable form for review and analysis by an application developer, system administrator, customer service provider, and/or other type of data analyst.

Further aspects of the described subject matter are illustrated by the following exemplary logging statements (e.g., function calls to a method of structured logging API 112) which may be implemented by one or more instrumentation points.

```
SendStructuredTrace(
    Category::TestCategory,
    Severity::Verbose,
    "Report a string.",
    StructuredString(L"str", L"a string"));
SendStructuredTrace(
    Category::TestCategory,
    Severity::Verbose,
    "FooObj Constructed. ",
    StructuredBool(L"bool", true),
    StructuredInt(L"int", 8));
```

Table 2 shows exemplary trace log entries of trace log 132 that may be output by disk log sink 130 in response to the exemplary logging statements. It is to be understood that the exemplary logging statements and trace log entries are not intended to limit the described subject matter to particular implementations.

field, and a Message field. In one implementation, the Timestamp field, PID field, TID field, Product field, Event ID field, and Correlation field of each exemplary log entry may be populated with logging information automatically provided by SLS 110.

The Category field of each exemplary trace log entry may be populated with structured trace event information passed in to structured logging API 112 via the respective Category::TestCategory arguments of the exemplary logging statements. The Level field of each exemplary trace log entry may be populated with structured trace event information passed in to structured logging API 112 via the respective Severity::Verbose arguments of the exemplary logging statements.

The message field of the first exemplary trace log entry may be populated with structured trace event information passed in to structured logging API 112 via the "Report a string." label argument and the structured payload StructuredString(L"str", L"a string") of the first exemplary logging statement. The message field of the second exemplary trace log entry may be populated with structured trace event information passed in to structured logging API 112 via the "FooObj Constructed." label argument and the structured payload StructuredBool(L"bool", true), StructuredInt (L"int", 8) of the second exemplary logging statement.

In various implementations, the structured data types StructuredString, StructuredBool, and StructuredInt may be supported by both structured logging API 112 and rules engine 150. When structured logging API 112 is called via the exemplary logging statements, trace event arguments including the structured payloads may be passed in to SLS 110. In response, SLS 110 may capture structured trace event information and determine that the captured structured trace event information is to be output to disk log sink 130 as a serialized string. SLS 110 (e.g., via log writing component 114 and/or serialization component 116) may perform string serialization of the strongly-typed key-value pairs contained in the structured payloads for output as serialized strings in a format that is both human-readable and machine-readable, such as JSON format.

As shown in Table 2, the message field of the first exemplary trace log entry includes a JSON-serialized portion {"str":"a string"} containing a JSON key-value pair or dictionary that follows the label-specified message Report a string. The message field of the second exemplary trace log entry includes a JSON-serialized portion {"bool":true, "int": 8} containing a series of JSON key-value pairs or dictionary that follows the label-specified message FooObj Constructed. It can be appreciated that structured trace event

TABLE 2

| Timestamp | PID | TID | Product | Category | Event ID | Level | Correlation | Message |
|---|---|---|---|---|---|---|---|---|
| 06/01/2013 13:36:12.87 | w3wp.exe (0x0EFC) | 0x20D8 | SharePoint Foundation | TestCategory | d0i2 | Verbose | | Report a string, {"str":" a string"} |
| 06/01/2013 13:36:12.87 | w3wp.exe (0x0EFC) | 0x20D8 | SharePoint Foundation | TestCategory | d0i2 | Verbose | | FooObj Constructed. {"bool":true, "int":8 } |

As shown in Table 2, the exemplary trace log entries include various data fields for presenting items of structured trace event information in human-readable form for review and analysis. In this example, the data fields may include a Timestamp field, a PID field, a TID field, a Product field, a Category field, an Event ID field, a Level field, a Correlation information to be presented in each message field of each exemplary trace log entry may be received by SLS 110 (e.g., via structured logging API 112) as a label argument and a structured payload containing one or more strongly-typed key-value pairs, as opposed to a print-formatted (e.g., printf) string.

In various implementations, the schema of syntax employed by instrumentation points and structured logging API 112 enables trace log entries to provide one or more data fields (e.g., Message field) that contain structured trace event data that is both human-readable and machine-readable. Providing content for a particular data field (e.g., Message field) as a label argument and a structured payload, as opposed to a print-formatted (e.g., printf) string, enables the content to be presented in the particular data field as message text that is followed by and separate from one or more key-value pairs, as opposed to a message string which intermixes meaningful parameter values and text. As such, when a human-readable and machine-readable format such as JSON is implemented, log entry data fields may be easily read and understand by a developer or other data analyst as well as by a computer program (e.g., script) configured to parse and/or pull structured trace event information from log entry data fields.

Figure 4:
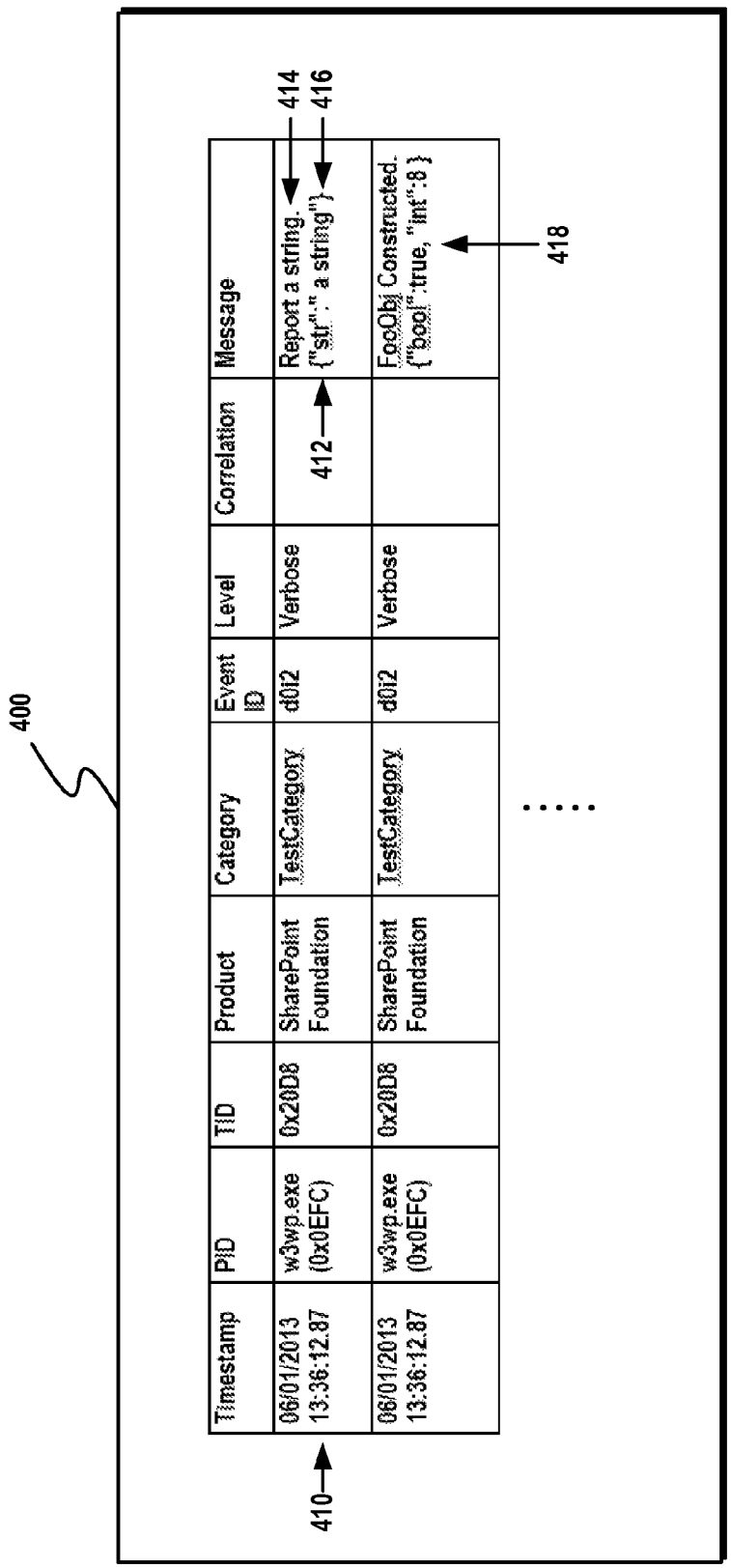
FIG. 4 illustrates an embodiment of an exemplary user interface in accordance with aspects of the described subject matter.

FIG. 4 illustrates a user interface (UI) 400 as an embodiment of an exemplary user interface in accordance with aspects of the described subject matter. In one implementation, UI 400 may present structured trace event information of trace log 132. UI 400 may be implemented by computer-executable instructions that may be executed by one or more computing devices and/or computer systems.

In various implementations, structured trace event information of trace log 132 may be presented to a user (e.g., developer, data analyst, etc.) via UI 400. UI 400 may be implemented, for example, by a text editor, log viewer application, browser, and/or other suitable type of diagnostic tool. UI 400 may present structured trace event information in row-column format. Rows of structured trace event information may correspond to trace log entries. Each trace log entry may contain different data fields that, in turn, may correspond to columns.

For purposes of illustration, UI 400 is shown as presenting the exemplary trace log entries of Table 2. As shown, UI 400 may present a log entry 410 containing a data field 412 (e.g., message data field). Data field 412 may include a text-only message string 414 followed by a serialized string 416. Serialized strings may contain one or more serialized key-value pairs (e.g., JSON-serialized key-value pairs), as illustrated by serialized string 416 and serialized string 418.

In various implementations, trace log entries may be reviewed, searched, and/or filtered based on serialized key-value pairs contained in serialized string 416 and serialized string 418. It can be appreciated that structuring trace event information as serialized strings within trace log entries may facilitate locating and extracting keys and values of interest when analyzing a vast number of trace log entries contained in trace log 132.

Figure 5:
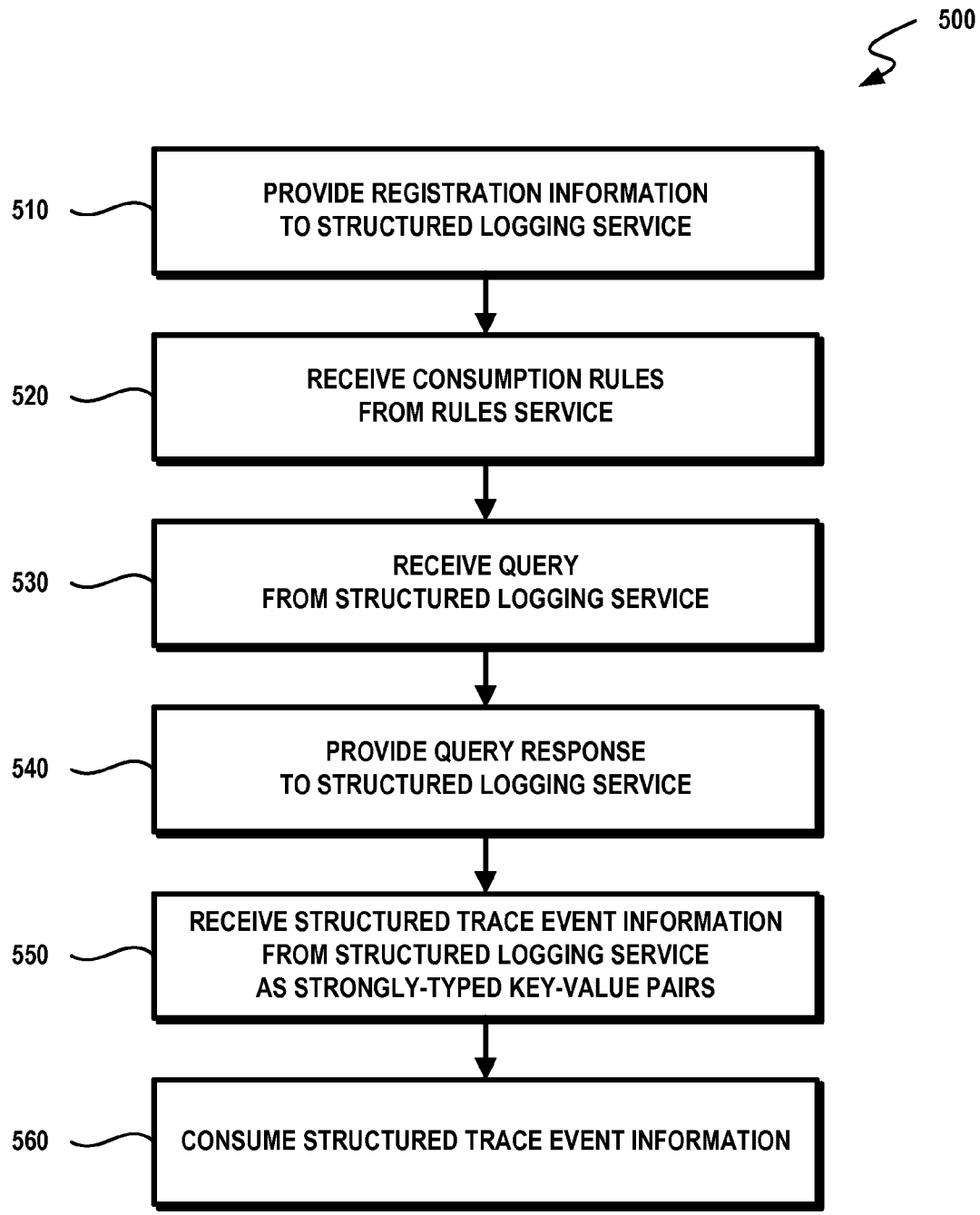
FIG. 5 illustrates an embodiment of an exemplary structured logging process in accordance with aspects of the described subject matter.

FIG. 5 illustrates a computer-implemented method 500 as an embodiment of an exemplary structured logging process in accordance with aspects of the described subject matter. In one implementation, computer-implemented method 500 may be performed by rules engine 150. It is to be appreciated that computer-implemented method 500, or portions thereof, may be performed by other components and may be implemented by software, hardware, firmware or a combination thereof in various embodiments.

At 510, rules engine 150 may provide registration information to SLS 110. Rules engine 150 may register with SLS 110 for enabling rules engine 150 to received structured trace event information from SLS 110 and/or log writing component 114. Structured trace event information may correspond to one or more trace events that occur in an application at runtime when instrumentation point 120 is encountered. Implementation point 120 may include a logging statement configured to pass in items of structured trace event information to SLS 110 via trace event arguments. The items of structured trace event information may be related to the state of an application, one or more application components, and/or one or more processes at various stages of execution and/or when interacting with other local and/or remote applications, components, and/or processes.

At 520, rules engine 150 may receive consumption rules 152 from rules service 170. Consumption rules 152 may specify targeting criteria for requesting and/or collecting items of structured trace event information at any given point in time. The targeting criteria may identify the properties of structured trace event information which are of interest to rules engine 150, the timing and duration of collection, conditions for collection, and so forth. Consumption rules 152 may specify one or more actions that rules engine 150 may take with respect to collected items of structured trace event information.

At 530, rules engine 150 may receive a query from SLS 110. The query from SLS 110 may inform rules engine 150 that structured trace event information is available for output from SLS 110. The query may include a set or a subset of available structured trace event information. For example, the query may notify rules engine 150 that available structured trace event information having certain properties (e.g., a particular trace category, a particular trace severity, and/or a particular trace tag) may be output. The query may inquire whether rules engine 150 is interested in the available structured trace event information. The query also may inquire how available structured trace event information such as a structured payload is to be delivered to rules engine 150.

At 540, rules engine 150 may provide a query response to SLS 110. Rules engine 150 may respond affirmatively to a query from SLS 110 when properties of the structured trace event information satisfy the targeting criteria specified by consumption rules 152. Rules engine 150 may respond to a query from SLS 110 by requesting structured trace event information such as the structured payload to be delivered as strongly-typed key-value pairs. The structured payload may be implemented by a variable number of strongly-typed key-value pairs, a series of strongly-typed key-value pairs, and/or collection of strongly-typed key-value pairs that provide various items of structured trace event information.

At 550, rules engine 150 may receive structured trace event information from SLS 110. Rules engine 150 may receive structured trace event information such as the structured payload as one or more strongly-typed key-value pairs, a series of strongly-type of key-value pairs, one or more structured objects, a tuple of structured objects, data, and/or metadata built from the one or more strongly-typed key-value pairs contained in the structured payload.

In addition to strongly-typed key-value pairs of the structured payload, rules engine 150 may receive structured trace event information including one or more key-value pairs, one or more structured objects, data and/or metadata related to other types of trace event arguments (e.g., trace tag, trace category, trace severity, label, etc.) passed in by instrumentation point 120. Rules engine 150 also may receive structured trace event information including one or more key-value pairs, one or more structured objects, data, and/or metadata related to additional logging information (e.g., PID, TID, product or application name, Event ID, Correlation ID, deployment, role, role instance, etc.) provided by SLS 110.

At 560, rules engine 150 may consume structured trace event information. At runtime, rules engine 150 may consume structured trace event received from SLS 110. Rules engine 150 may inspect structured trace event information received from SLS 110 and apply consumption rules 152 to parse and collect certain targeted items of structured trace event information. For example, rules engine 150 may step through a series of key-value pairs and/or tuple of structured objects to extract certain pieces of structured trace event that are of interest. Structured trace event information received from SLS 110 may include a structured payload of strongly-typed key-value pairs as well as structured trace event information related to various other trace event arguments supplied by instrumentation point 120 and/or related to additional logging information provided SLS 110. It can be appreciated that items of structured trace event information that are not specified for collection by consumption rules 152 may be ignored and/or discarded.

Rules engine 150 may consume structured trace event information by performing one or more actions specified by consumption rules 152. For example, rules engine 150 may communicate certain collected items to rules service 170 as telemetry data. Rules engine 150 also may analyze certain collected items, perform one or more calculations on certain collected items, and/or generate rule results based on analysis and/or calculations performed. Rules engine 150 may communicate rule results to rules service 170 as telemetry data and/or take one or more local actions based on the rule results.

It can be appreciated that aspects of the described subject matter may provide various attendant and/or technical advantages in terms of improved efficiency and/or savings with respect to power consumption, memory, processor cycles, and/or other computationally-expensive resources. By way of illustration and not limitation, aspects of structured logging and instrumentation framework 100 may provide various attendant and/or technical advantages in a variety of contexts and use case scenarios.

Aspects of structured logging and instrumentation framework 100 may facilitate instrumenting applications with logging statements and creating trace logs by providing a consistent schema of syntax that may enable developers to include structured trace event information within trace log entries. Structured logging and instrumentation framework 100 may promote the use of structured trace event data by product teams within an enterprise and may ensure consistency in the manner in which structured trace event information is implemented across product teams.

Aspects of structured logging and instrumentation framework 100 may restrict free form instrumentation and avoid print-formatted (e.g., printf) style instrumentation to facilitate human and machine readability of trace log entries. SLS framework 100 may implement a flexible, strongly-typed API that does not require a specific instrumentation manifest or schema and that is overloaded to allow a developer to use various and numerous combinations of strongly-typed key-value pairs for supplying structured trace event information.

Aspects of structured logging and instrumentation framework 100 may facilitate creation of trace logs by automatically creating trace log entries in a human-readable and machine-readable format in response to receiving strongly-typed key-value pairs containing structured trace event information. Structured logging and instrumentation framework 100 may automatically create serialized strings when a trace log is to be written in response to logging statements that supply strongly-typed key-value pairs and without requiring such logging statements to include a serialization request, statement, command, or call.

Aspects of structured logging and instrumentation framework 100 may facilitate analysis of trace logs by providing serialized structured trace event information within log entries. Structured logging and instrumentation framework 100 may serialize a payload of structured trace event information that may be presented within a message field of a trace log entry and used by developers to review, analyze, search, filter, and/or process trace log entries based on serialized key-value pairs contained in serialized strings.

Aspects of structured logging and instrumentation framework 100 may facilitate problem detection and diagnosis by developers. In response to user/customer reports of a problem with a certain application feature (e.g., word processing application font change functionality), a developer may obtain a trace log for an anonymized user corresponding to a time interval (e.g., session, time period, etc.) before and/or during which such problem was encountered. The trace log may contain trace log entries related to several features with which the anonymized user interacted during the time interval. The developer may use structured trace event information to identify a set of pertinent trace log entries generated in response to interaction with the problem feature and to extract values (e.g., new/previous fonts) from the set of pertinent trace log entries. The developer may use keys of interest (e.g., fontName and oldFontName) to locate pertinent log entries, search and extract keys and values from serialized strings within pertinent log entries, discover a context and/or condition that caused the problem (e.g., use of non-TrueType fonts), and identify and correct the error in the application code.

Aspects of structured logging and instrumentation framework 100 may facilitate parsing of trace logs by providing structured trace event information that is machine-readable and does not intermix meaningful parameters with text within a message string. Structured logging and instrumentation framework 100 may provide meaningful structured trace event information in a machine-readable and structured format that reduces parsing overhead, improves parsing performance, and streamlines downstream processing of trace logs.

Aspects of structured logging and instrumentation framework 100 may promote inclusion of meaningful structured trace event information when instrumenting an application for problem detection and product improvement. By enabling the use of strongly-typed key-value pairs to supply structured trace event information, structured logging and instrumentation framework 100 may encourage developers to supply a greater amount of structured trace event information when instrumenting an application in order to address potential issues that may arise. Structured logging and instrumentation framework 100 may enable the collection of usage telemetry in response to trace events triggered at runtime when a developer or anonymized user interacts with an application, an application feature (e.g., user interface, user interface component), and/or an application document. Trace events may be triggered by instrumented applications, frameworks, or engines in response to various interactions (e.g., click, tap, loading an application document, etc.) for logging structured trace event information such as: click or tap, user interface surface location (e.g., ribbon, context menu) of click or tap, command executed by click or tap, application response to click or tap, and/or application document properties (e.g., file size on disk, file size in memory, number of calculated cells, number of tables, number of charts, etc.).

Aspects of structured logging and instrumentation framework 100 may promote and facilitate local processing of structured trace event information by a rules-based consumer. Structured logging and instrumentation framework 100 may implement a rules-based consumer as a computer program or engine configured to inspect and process structured trace event information from instrumentation points at runtime. The rules-based consumer may enable near-real time notification of certain trace events and allow other trace events to be silently discarded. The rules-based consumer may be configured to consume structured trace event from instrumentation points as strongly-typed key-value pairs without requiring serialization. Structured logging and instrumentation framework 100 may enable structured trace event information to flow from instrumentation points to the rules-based consumer as strongly-typed key pairs to avoid writing structured trace event information to a trace log, avoid degrading client performance, and avoid the expensive processing overhead of serialization. Structured logging and instrumentation framework 100 may enable broad machine-based log analysis without the need to convert to and from string log statements.

Aspects of structured logging and instrumentation framework 100 may promote and facilitate efficient processing of structured trace event information. Structured logging and instrumentation framework 100 may implement a rules-based consumer that can be configured to target specific instrumentation points and/or specific pieces of structured trace event information that are required for analysis. A developer may specify criteria for the rules-based consumer to target specific logging statements within an application that are required to send real-time performance and/or telemetry data. Accordingly, only performance and/or telemetry data that is necessary for review at a given time is communicated to facilitate developer review and to minimize processing overhead and network bandwidth.

Aspects of structured logging and instrumentation framework 100 may enable collection and analysis of important telemetry data while respecting the privacy interests of users. Structured logging and instrumentation framework 100 may implement a rules-based consumer configured to target specific items of structured trace event information which are permissible and necessary for a given context. Instrumentation code implemented by a developer may include logging statements designed to supply a vast amount of in-depth performance data for use in pre-deployment scenarios such as debugging and testing on a local computer of the developer. Instrumentation code implemented during development may be maintained within a deployed application and may continue to supply performance data that may be used in telemetry scenarios. The rules-based consumer may target and extract only telemetry data that is permissible and important to collect from the deployed application and may act on such telemetry data locally or communicate such telemetry data to a network-based service for remote analysis.

Aspects of structured logging and instrumentation framework 100 may facilitate faster problem detection and diagnosis by developers. Structured logging and instrumentation framework 100 may implement a rules-based consumer configured to process structured trace event information at runtime for enabling near-real time notification of trace events. In response to user/customer reports of a problem with a certain application feature (e.g., word processing application layout change functionality), a developer may create and dynamically distribute rules to a subset of the production base. The rules may include a rule to target (e.g., via tag, category, severity, and/or key-value pair content) and collect specific items of structured trace event information related to the problem feature (e.g., items indicating a "WordLayout" category). The rules may include a rule to calculate certain counts (e.g., the number of times an anonymized user taps an "Orientation" button throughout a course of a session) related to the problem feature and a rule to calculate additional metrics (e.g., the amount of time for which orientation was in portrait as opposed to landscape) based on the counts. The rules-based consumer may generate rule results based on the calculations and provide collected items and/or rule results as telemetry data that supplies necessary information and prevents the collection of unnecessary logging information. The developer may examine the telemetry data to determine the context and/or conditions that cause the problem (e.g., rapidly changing orientation from portrait to landscape and then back), focus analysis of application code, and resolve the problem.

Exemplary Operating Environments

Aspects of the described subject matter may be provided by various operating environments. For example, structured logging and instrumentation framework 100 and/or parts thereof may be implemented for a particular application (e.g., client application, server application, mobile device application, distributed application, etc.) and/or by (e.g., in the application code of) such particular application. Structured logging and instrumentation framework 100 and/or parts thereof may be designed to provide consistent structured logging and/or instrumentation within such application across multiple contexts.

Structured logging and instrumentation framework 100 and/or parts thereof may be implemented for and/or by various types of applications (e.g., word processing application, spreadsheet application, slideshow presentation application, note-taking application, email application, browser application, etc.) and/or a particular group of such applications. Structured logging and instrumentation framework 100 and/or parts thereof may be designed to provide consistent structured logging and/or instrumentation across different types of applications.

Structured logging and instrumentation framework 100 and/or parts thereof may be implemented for and/or by one or more applications that operate across various platforms and/or operating systems (e.g., a Microsoft® Windows® operating system, a Google® Android™ operating system, an Apple iOS™ operating system). Structured logging and instrumentation framework 100 and/or parts thereof may be designed to provide consistent structured logging and/or instrumentation for one or more applications across multiple platforms and/or operating systems.

Structured logging and instrumentation framework 100 and/or parts thereof may be implemented for and/by one or more applications that operate across various form factors (e.g., desktop, laptop, tablet, mobile, etc.) and/or input types (e.g., keyboard, mouse, touch, voice, etc.). Structured logging and instrumentation framework 100 and/or parts thereof may be designed to provide consistent structured logging and/or instrumentation across multiple form factors and/or input types.

In various operating environments, structured logging and instrumentation framework 100 and/or parts thereof may be implemented by computer-executable instructions that may be executed by one or more computing devices and/or computer systems. In its most basic configuration, a computing device and/or computer system may include at least one processing unit (e.g., single-processor units, multi-processor units, single-core units, and/or multi-core units)

and memory. Depending on the exact configuration and type of computer system or computing device, the memory implemented by a computing device and/or computer system may be volatile (e.g., random access memory (RAM)), non-volatile (e.g., read-only memory (ROM), flash memory, and the like), or a combination thereof.

A computing devices and/or computer system may have additional features and/or functionality. For example, a computing device and/or computer system may include hardware such as additional storage (e.g., removable and/or non-removable) including, but not limited to: solid state, magnetic, optical disk, or tape.

A computing device and/or computer system typically may include or may access a variety of computer-readable media. For instance, computer-readable media can embody computer-executable instructions for execution by a computing device and/or a computer system. Computer readable media can be any available media that can be accessed by a computing device and/or a computer system and includes both volatile and non-volatile media, and removable and non-removable media. As used herein, the term "computer-readable media" includes computer-readable storage media and communication media.

The term "computer-readable storage media" as used herein includes volatile and nonvolatile, removable and non-removable media for storage of information such as computer-executable instructions, data structures, program modules, or other data. Examples of computer-readable storage media include, but are not limited to: memory storage devices such as RAM, ROM, electrically erasable program read-only memory (EEPROM), semiconductor memories, dynamic memory (e.g., dynamic random access memory (DRAM), synchronous dynamic random access memory (SDRAM), double data rate synchronous dynamic random-access memory (DDR SDRAM), etc.), integrated circuits, solid-state drives, flash memory (e.g., NAN-based flash memory), memory chips, memory cards, memory sticks, thumb drives, and the like; optical storage media such as Blu-ray discs, digital video discs (DVDs), compact discs (CDs), CD-ROM, optical disc cartridges, and the like; magnetic storage media including hard disk drives, floppy disks, flexible disks, magnetic cassettes, magnetic tape, and the like; and other types of computer-readable storage devices. It can be appreciated that various types of computer-readable storage media (e.g., memory and additional hardware storage) may be part of a computing device and/or a computer system.

In various embodiments, aspects the described subject matter may be implemented by computer-executable instructions stored on one or more computer-readable storage media. As used herein, the terms "computer-readable storage media" and "computer-readable storage medium" do not refer to and do not encompass a propagated signal, a modulated data signal, a carrier wave, or any other type of transitory computer-readable medium.

Communication media typically embodies computer-executable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media.

A computing device and/or computer system may include various input devices, output devices, communication interfaces, and/or other types of devices. Exemplary input devices include, without limitation: a user interface, a keyboard/keypad, a touch screen, a touch pad, a pen, a mouse, a trackball, a remote control, a game controller, a camera, a barcode reader, a microphone or other voice input device, a video input device, laser range finder, a motion sensing device, a gesture detection device, and/or other type of input mechanism and/or device. Exemplary output devices include, without limitation: a display, a projector, a speaker, a printer, and/or other type of output mechanism and/or device.

A computing device and/or computer system may include one or more communication interfaces that allow communication between and among other computing devices and/or computer systems. Communication interfaces may be used in the context of network communication between and among various computing devices and/or computer systems. Communication interfaces may allow a computing device and/or computer system to communicate with one or more web services (e.g., an affiliated web service, a third-party web service, a remote web service, and the like), web service applications, and/or information sources (e.g. an affiliated information source, a third-party information source, a remote information source, and the like). As such communication interfaces may be used in the context of accessing, obtaining data from, and/or cooperating with various types of resources.

Communication interfaces also may be used in the context of distributing computer-executable instructions over a network. For example, computer-executable instructions can be combined or distributed utilizing remote computers and storage devices. A local or terminal computer may access a remote computer or remote storage device and download a computer program or one or more parts of the computer program for execution. It also can be appreciated that the execution of computer-executable instructions may be distributed by executing some instructions at a local terminal and executing some instructions at a remote computer.

Exemplary Client-Server Operating Environment

Figure 6:
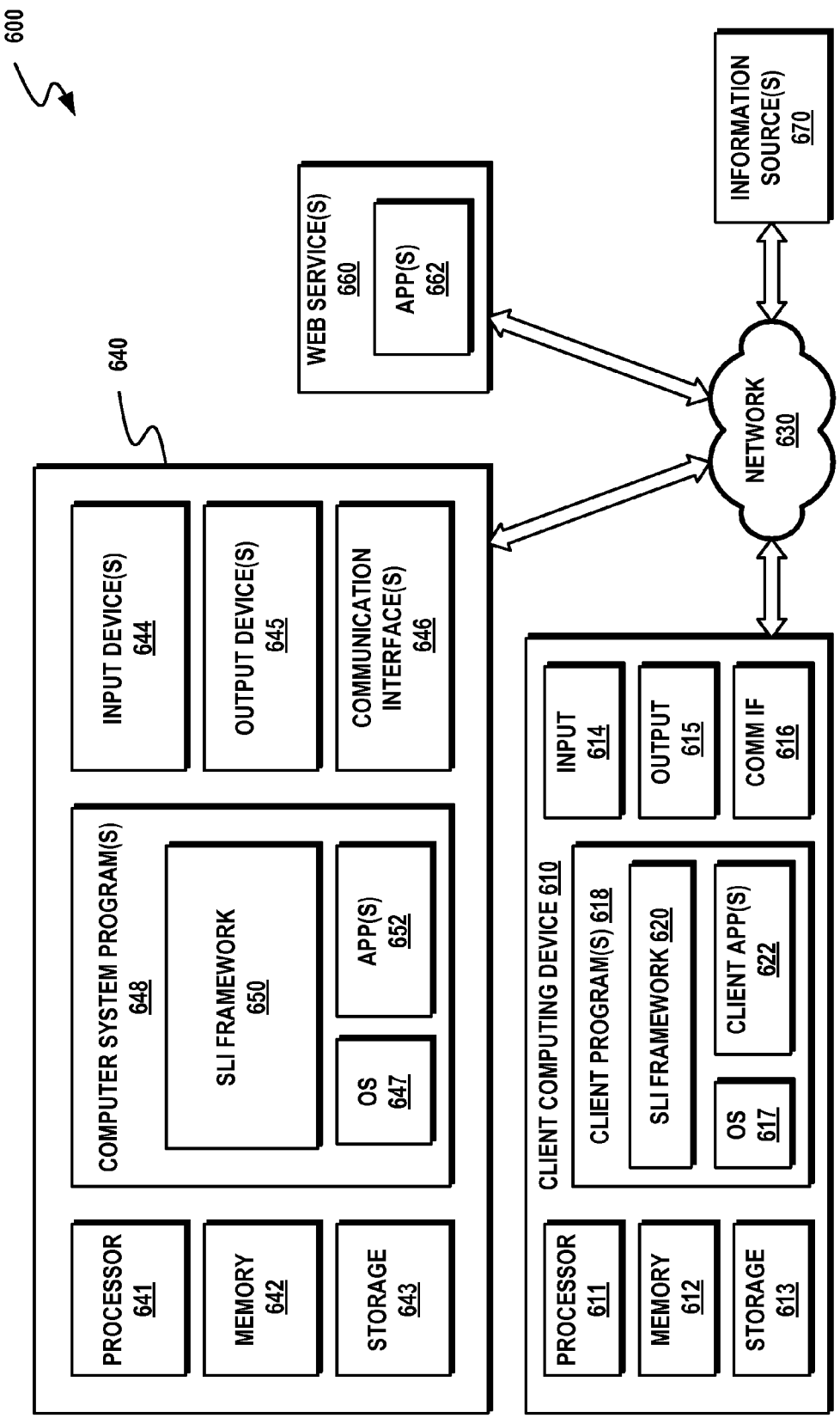
FIG. 6 illustrates an embodiment of an exemplary operating environment that may implement aspects of the described subject matter.

FIG. 6 illustrates an operating environment 600 as an embodiment of an exemplary operating environment that may implement aspects of the described subject matter. It is to be appreciated that operating environment 600 may be implemented by a client-server model and/or architecture as well as by other operating environment models and/or architectures in various embodiments.

In one implementation, operating environment 600 includes a client computing device 610. Client computing device 610 may be implemented by one or more computing devices. Client computing device 610 may be implemented, for example, by a mobile computing device such as: a mobile phone (e.g., a cellular phone, a smart phone such as a Microsoft® Windows® phone, an Apple iPhone, a BlackBerry® phone, a phone implementing a Google® Android™ operating system, a phone implementing a Linux® operating system, or other type of phone implementing a mobile operating system), a tablet computer (e.g., a Microsoft® Surface® device, an Apple iPad™, a Samsung Galaxy Note® Pro, or other type of tablet device), a laptop computer, a notebook computer, a netbook computer, a personal digital assistant (PDA), a portable media player, a handheld gaming console, a wearable computing device (e.g., a smart watch, a head-mounted device including smart glasses such as Google® Glass™, a wearable monitor, etc.), a personal navigation device, a vehicle computer (e.g., an on-board navigation system), a camera, or other type of mobile device.

Client computing device 610 also may be implemented by a stationary computing device such as: a desktop computer, a personal computer, an entertainment system device, a media player, a media system or console, a video-game system or console, a multipurpose system or console (e.g., a combined multimedia and video-game system or console such as a Microsoft® Xbox® system or console, a Sony® PlayStation® system or console, a Nintendo® system or console, or other type of multipurpose game system or console), a set-top box, an appliance (e.g., a television, a refrigerator, a cooking appliance, etc.), or other type of stationary computing device. Still further, client computing device 610 may be implemented by other types of processor-based computing devices including digital signal processors, field-programmable gate arrays (FPGAs), program- and application-specific integrated circuits (PASIC/ASICs), program- and application-specific standard products (PSSP/ASSPs), a system-on-a-chip (SoC), complex programmable logic devices (CPLDs), and the like.

As shown, client computing device 610 may include a processor 611 and memory 612. Client computing device 610 also may include additional hardware storage 613. It is to be understood computer-readable storage media includes memory 612 and hardware storage 613.

Client computing device 610 may be configured to receive user input and respond to such user input in various ways depending upon implementation. Client computing device 610 may include one or more input devices 614 for receiving user input. Client computing device 610 may be configured to respond to user input via one or more user interfaces and/or output devices 615. Responses may be presented in various forms including, for example: presenting a user interface, outputting an object such as an image, a video, a multimedia object, a document, and/or other type of object; outputting a text response; providing a link associated with responsive content; outputting a computer-generated voice response or other audio; or other type of visual and/or audio presentation of a response.

Client computing device 610 may contain one or more communication interfaces 616 that allow client computing device 610 to communicate with other devices. In various implementations, communication interfaces 616 implemented by client computing device 610 may be used to communicate over a network 630 with a computer system 640, one or more web service(s) 660, one or more web service application(s) 662, and/or one or more information source(s) 670. Communication interfaces 616 may further be used in the context of distributing computer-executable instructions over network 630.

Client computing device 610 may include an operating system 617 implemented, for example, by client program(s) 618. Operating system 617 may be implemented by one or more exemplary operating systems such as: a Microsoft® operating system (e.g., a Microsoft® Windows® operating system), a Google® operating system (e.g., a Google® Chrome OS™ operating system or a Google® Android™ operating system), an Apple operating system (e.g., a Mac OS® or an Apple iOS™ operating system), an open source operating system, or any other operating system suitable for running on a mobile, stationary, and/or processor-based computing device. It can be appreciated that client computing device 610 may include more than one operating system in some implementations.

Client computing device 610 may include and/or run one or more client program(s) 618 implemented, for example, by software, firmware, hardware, logic, and/or circuitry of client computing device 610. Client program(s) 618 may be distributed to and/or installed on client computing device 610 in various ways. For instance, client program(s) 618 may be pre-installed on client computing device 610 by an original equipment manufacturer (OEM), installed on client computing device 610 as part of installation of another client program, downloaded from an application store and installed on client computing device 610, distributed and/or installed by a system administrator using an enterprise network management tool, and distributed and/or installed in various other ways depending upon the implementation.

Client program(s) 618 may include or implement computer-executable instructions that are configured to perform various steps, methods and/or functionality in accordance with the described subject matter. Computer system program(s) 648 may be stored in computer-readable storage media such as memory 612 or hardware storage 613, for example.

As shown, client computing device 610 and/or client programs(s) 618 may implement a structured logging and instrumentation framework 620. In various implementations, structured logging and instrumentation framework 620 may be implemented for and/or by one or more client program(s) 618. Client program(s) 618 may include operating system 617 and one or more client application(s) 622 implemented by client computing device 610.

Client application(s) 622 may be implemented by one or more exemplary client applications such as: a web browsing application, a communication application (e.g., a telephony application, an e-mail application, a text messaging application, an instant messaging application, and the like), a media application (e.g., a video application, a movie service application, a television service application, a music service application, an e-book application, a photo application, and the like), a calendar application, a game application, a graphics application, a shopping application, a payment application, a social media application, a social networking application, a news application, a sports application, a weather application, a mapping application, a navigation application, a travel application, a restaurants application, an entertainment application, a healthcare application, a lifestyle application, a reference application, a finance application, a business application, an education application, a productivity application (e.g., word processing application, a spreadsheet application, a slide show presentation application, a note-taking application, and the like), a security application, a tools application, a utility application, and/or any other type of application, application program, and/or app suitable for running on a mobile, stationary, and/or processor-based computing device.

Client application(s) 622 also may include an intelligent personal assistant and/or other type of conversational application in various implementations. A conversational application may be implemented as any type of application, application program, and/or app configured to engage in a dialog with a user. Intelligent personal assistant may be engaged in response to a user making a statement (e.g., stating a particular name, word, and/or phrase) or performing an action (e.g., pressing an icon) that is intended to trigger intelligent personal assistant. The intelligent personal assistant may be configured to receive one or more types of user input (e.g., verbal user input, text user input, handwritten user input, and/or other types of user input) and to provide an audio and/or visual response to such user input.

Intelligent personal assistant also may be configured to use any of various artificial intelligence and/or machine learning techniques to improve performance over time based on user interaction.

The intelligent personal assistant may perform various types of tasks on behalf of the user. Exemplary tasks include, but are not limited to: answering a question; scheduling a meeting, alert, or other event; contacting a user-specified person by telephone, text messaging, instant messaging, or e-mail for example; performing a search; finding, obtaining, and/or rendering a user-specified media item (e.g., movie, television program, music item, game, photo, book, article, document, and the like); locating, recommending, and/or obtaining directions to a user-specified location (e.g., commercial establishment, point-of-interest, and the like); obtaining current information (e.g., current time, current or forecasted weather information, traffic conditions, sports scores or schedules, stock market information, personal finance information, and the like); finding and/or purchasing a user-specified product (e.g., merchandise, tickets to an event, and the like); posting user-specified content to a social media web site or microblogging service; recording a user-specified reminder or note; launching a user-specified application; and other types of requested actions.

Client application(s) 622 may perform various processing steps, such as accessing local and/or remote resources, in order to obtain and provide a response to user input. In the interest of user privacy, client application(s) 622 may obtain appropriate permission from a user of client computing device 610 in order to access such local and/or remote resources. For example, one or more of client application(s) 622 may request and receive authorization from a user to access certain types of local resources such as client program(s) 618 and/or data associated with client program(s) 618.

Client application(s) 622 may be configured via one or more suitable interfaces (e.g., an application programming interface (API) or other data connection) to: access, obtain data from, and/or cooperate with one or more other client applications to obtain and provide a response to user input. One or more of client application(s) 622 may access, obtain data from, and/or cooperate with one or more remote resources to obtain and provide a response to user input. For example, one or more of client application(s) 622 may be configured via one or more suitable interfaces (e.g., an API or other data connection) to communicate with one or more remote resources over network 630.

Examples of such remote resources may include, but are not limited to: server-hosted, cloud-based, and/or online resources associated with any of the various exemplary client applications described above; server-hosted, cloud-based, and/or online versions of any of the various exemplary client applications described above; remote data stores, databases, repositories, and the like; web services, web sites, web pages, web content, and the like; and other types of server-hosted, cloud-based, and/or online applications, information sources, and/or content.

In the embodiment shown in FIG. 6, client computing device 610 and computer system 640 may be configured to communicate via network 630. Network 630 may be implemented by any type of network or combination of networks suitable for facilitating communication between client computing device 610 and computer system 640. Network 630 may include, for example and without limitation: a wide area network (WAN) such as the Internet, a local area network (LAN), a private network, a public network, a packet network, a circuit-switched network, a wired network, and/or a wireless network. Client computing device 610 and computer system 640 may communicate over network 630 using various communication protocols and/or data types (e.g., binary data, text data, eXtensible Markup Language (XML) data, Hypertext Markup Language (HTML) data, Simple Object Access Protocol (SOAP) data, Remote Procedure Call (RPC) data, web service call data, message data, and the like).

Computer system 640 may be implemented by a computing device, such as a server computer, or by multiple computing devices configured to implement one or more aspects described herein. Computer system 640 may include a processor 641 and memory 642. Computer system 640 also may include additional hardware storage 643. It is to be understood that computer-readable storage media includes memory 642 and hardware storage 643.

Computer system 640 also may include input device(s) 644 and output device(s) 645. Input device(s) 644 may include one or more of the exemplary input devices described above and/or other type of input mechanism and/or device. Output device(s) 645 may include one or more of the exemplary output devices described above and/or other type of output mechanism and/or device.

Computer system 640 may contain one or more communication interfaces 646 that allow computer system 640 to communicate with other devices. In various implementations, communication interfaces 646 implemented by 640 may be used to communicate over network 630 with client computing device 610, one or more web service(s) 660, one or more web service application(s) 662, and/or one or more information source(s) 670. Communication interfaces 646 may further be used in the context of distributing computer-executable instructions over network 630.

In some implementations, for example, computer system 640 may be implemented as a backend service in which one or more suitably-configured computing devices may perform one or more processing steps. Computer system 640 can be a distributed computing system in which components are located on different computing devices that are connected to each other through network (e.g., wired and/or wireless) and/or other forms of direct and/or indirect connections. Computer system 640 also may be implemented via a cloud-based architecture (e.g., public, private, or a combination thereof) in which services are delivered through shared data centers. It is also contemplated that some components of computer system 640 may be disposed within a cloud while other components are disposed outside of the cloud.

Computer system 640 may include an operating system 647 implemented, for example, by computer system program(s) 648. Operating system 442 may be implemented, for example, by one or more exemplary operating systems described above and/or other type of operating system suitable for running on computer system 640.

Computer system 640 may include and/or run one or more computer system program(s) 648 implemented, for example, by software, firmware, hardware, logic, and/or circuitry of computer system 640. Computer system program(s) 648 may include or implement computer-executable instructions that are configured to perform various steps, methods and/or functionality in accordance with the described subject matter. Computer system program(s) 648 may be stored in computer-readable storage media such as memory 644 or storage 646, for example.

As shown, computer system 640 and/or computer system programs(s) 648 may implement a structured logging and instrumentation framework 650. In various implementations, structured logging and instrumentation framework 650 may be implemented for and/or by one or more computer system program(s) 648. Computer system program(s) 648 may include operating system 647 and one or more computer system application(s) 652 implemented by computer system 640.

Computer system program(s) 648 may include one or more computer system application(s) 652 implemented by computer system 640. Computer system application(s) 444 may be implemented, for example, by: one or more server-hosted, cloud-based, and/or online applications associated with any of the various types of exemplary client applications described above; one or more server-hosted, cloud-based, and/or online versions of any of the various types of exemplary client applications described above; one or more applications configured to provide a web service, a web site, a web page, web content, and the like; one or more applications configured to provide and/or access an information source, data store, database, repository, and the like; and/or other type of application, application program, and/or app suitable for running on computer system 640.

FIG. 6 illustrates structured logging and instrumentation framework 620 and structured logging and instrumentation framework 650 as exemplary frameworks in accordance with the described subject matter. In various embodiments, structured logging and instrumentation framework 620 and structured logging and instrumentation framework 650 may operate independently from each other or in cooperation with each other. It is to be understood that some embodiments may include either structured logging and instrumentation framework 620 or structured logging and instrumentation framework 650.

Structured logging and instrumentation framework 620 may be implemented, for example, by client computing device 610 and/or computer-executable instructions that are stored on a computer-readable storage medium and configured to perform various steps, methods and/or functionality in accordance with the described subject matter. Structured logging and instrumentation framework 620 and/or portions thereof may be implemented by software, hardware, firmware or a combination thereof in various embodiments. It is to be understood that structured logging and instrumentation framework 620 may be implemented as an example of structured logging and instrumentation framework 100 and may be implemented by multiple computing devices.

Structured logging and instrumentation framework 650 may be implemented, for example, by computer system 640 and/or computer-executable instructions that are stored on a computer-readable storage medium and configured to perform various steps, methods and/or functionality in accordance with the described subject matter. Structured logging and instrumentation framework 620 and/or portions thereof may be implemented by software, hardware, firmware or a combination thereof in various embodiments. It is to be understood that structured logging and instrumentation framework 620 may be implemented as an example of structured logging and instrumentation framework 100 and may be implemented by multiple computer systems.

In some embodiments, structured logging and instrumentation framework 620 and/or structured logging and instrumentation framework 650, or portions thereof, may be implemented by other types of computing devices and/or computer systems including, but not limited to, web service(s) 660 and/or information source(s) 670.

Structured logging and instrumentation framework 620 and/or structured logging and instrumentation framework 650 may be implemented for and/or by various applications (e.g., client application(s) 622, computer system application(s) 652, web service application(s) 662, etc.) Structured logging and instrumentation framework 620 and/or structured logging and instrumentation framework 650 may be configured via one or more suitable interfaces (e.g., an API or other data connection) to communicate with various components of client computing device 610, computer system 640, web service(s) 660, and/or information source(s) 670.

In various embodiments, structured logging and instrumentation framework 620 and/or structured logging and instrumentation framework 650 may be implemented by computer-executable instructions using any various types of suitable programming and/or markup languages such as Extensible Application Markup Language (XAML), XML, XBL HTML, XHTML, XSLT, XMLHttpRequestObject, CSS, Document Object Model (DOM), Java®, JavaScript, JavaScript Object Notation (JSON), Jscript, ECMAScript, Ajax, Flash®, Silverlight™, Visual Basic® (VB), VBScript, PHP, ASP, Shockwave®, Python, Perl®, C, Objective-C, C++, C#/.net, and/or others.

In one or more embodiments, structured logging and instrumentation framework 620 and/or structured logging and instrumentation framework 650 may be a component an application and configured to provide various services that support the functionality of such application. In one or more other embodiments, structured logging and instrumentation framework 620 and/or structured logging and instrumentation framework 650 may support the functionality of an application as a separate service and/or component of another application.

Exemplary Mobile Computing Device

Figure 7:
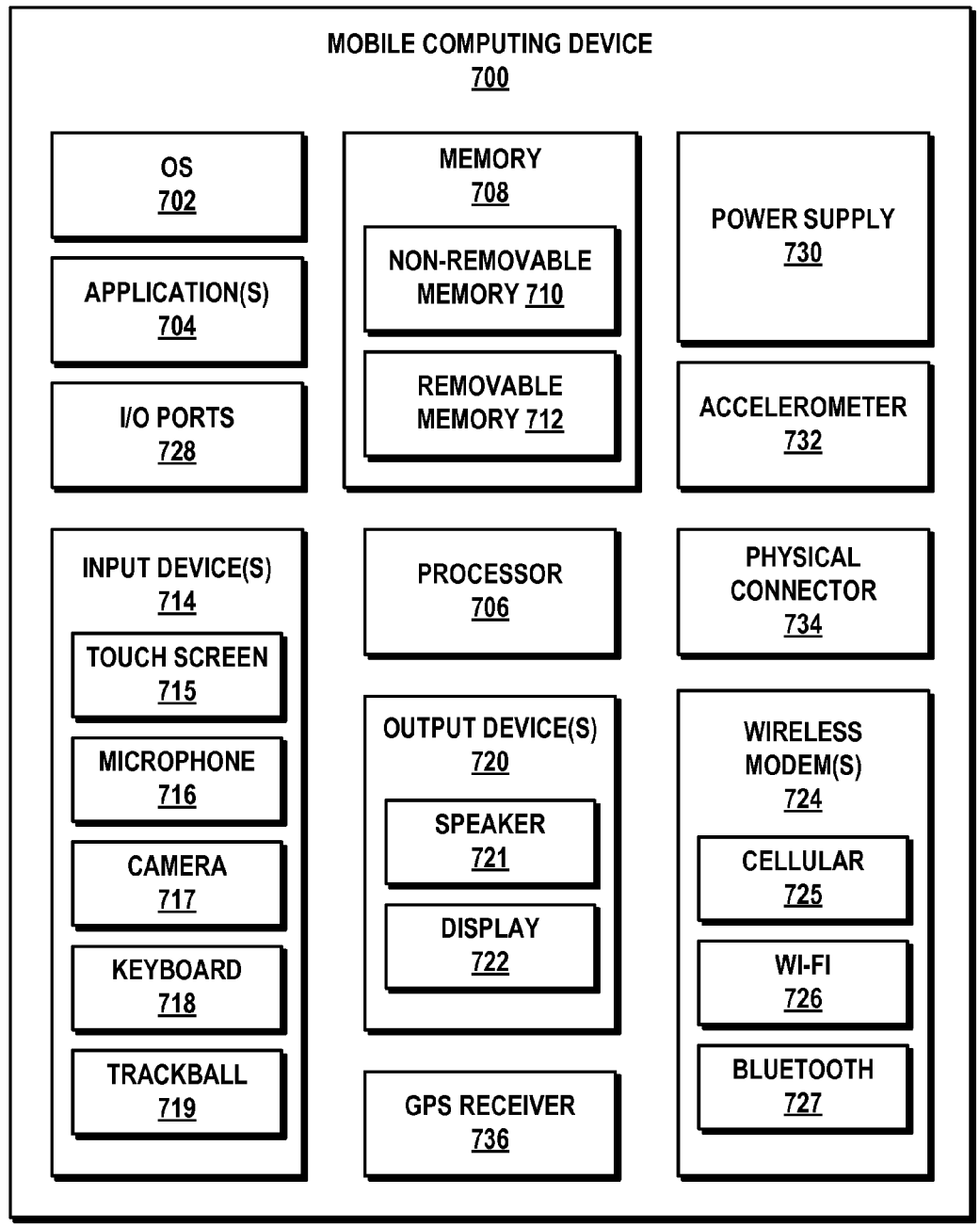
FIG. 7 illustrates an embodiment of an exemplary mobile computing device that may implement aspects of the described subject matter.

FIG. 7 illustrates a mobile computing device 700 as an embodiment of an exemplary mobile computing device that may implement aspects of the described subject matter. In one implementation, mobile computing device 700 may be an example of client computing device 610.

As shown, mobile computing device 700 includes a variety of hardware and software components that may communicate with each other. Mobile computing device 700 may represent any of the various types of mobile computing device described herein and can allow wireless two-way communication over a network (e.g., network 160, network 630, and the like), such as one or more mobile communications networks (e.g., cellular and/or satellite network), a LAN, and/or a WAN.

Mobile computing device 700 can include an operating system 702 (e.g., operating system 617 or other type of operating system) and various types of mobile application(s) 704. In some implementations, mobile application(s) 704 may include one or more of client application(s) 622 and/or may include one or more components of structured logging and instrumentation framework 620.

Mobile computing device 700 can include a processor 706 (e.g., signal processor, microprocessor, ASIC, or other control and processing logic circuitry) for performing tasks such as: signal coding, data processing, input/output processing, power control, and/or other functions.

Mobile computing device 700 can include memory 708 implemented as non-removable memory 710 and/or removable memory 712. Non-removable memory 710 can include RAM, ROM, flash memory, a hard disk, or other memory device. Removable memory 712 can include flash memory, a Subscriber Identity Module (SIM) card, a "smart card" and/or other memory device.

Memory 708 can be used for storing data and/or code for running operating system 702 and/or mobile application(s)

704. Example data can include web pages, text, images, sound files, video data, or other data to be sent to and/or received from one or more network servers or other devices via one or more wired and/or wireless networks. Memory 708 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

Mobile computing device 700 can include and/or support one or more input device(s) 714, such as a touch screen 715, a microphone 716, a camera 717, a keyboard 718, a trackball 719, and other types of input devices (e.g., a Natural User Interface (NUI) device and the like). Touch screen 715 may be implemented, for example, using a capacitive touch screen and/or optical sensors to detect touch input. Mobile computing device 700 can include and/or support one or more output device(s) 720, such as a speaker 721, a display 722, and/or other types of output devices (e.g., piezoelectric or other haptic output devices). In some implementations, touch screen 715 and display 722 can be combined in a single input/output device.

Mobile computing device 700 can include wireless modem(s) 724 that can be coupled to antenna(s) (not shown) and can support two-way communications between processor 706 and external devices. Wireless modem(s) 724 can include a cellular modem 725 for communicating with a mobile communication network and/or other radio-based modems (e.g., Wi-Fi 726 and/or Bluetooth 727). Typically, at least one of wireless modem(s) 724 is configured for: communication with one or more cellular networks, such as a GSM network for data and voice communications within a single cellular network; communication between cellular networks; or communication between mobile computing device 700 and a public switched telephone network (PSTN).

Mobile computing device 700 can further include at least one input/output port 728, a power supply 730, an accelerometer 732, a physical connector 734 (e.g., a USB port, IEEE 1394 (FireWire) port, RS-232 port, and the like), and/or a Global Positioning System (GPS) receiver 736 or other type of a satellite navigation system receiver. It can be appreciated the illustrated components of mobile computing device 700 are not required or all-inclusive, as various components can be omitted and other components can be included in various embodiments.

In various implementations, components of mobile computing device 700 may be configured to perform various operations described in connection with client computing device 610, client application(s) 622, and/or other computing devices and/or applications. In one example embodiment, computer-executable instructions for performing such operations may be stored in a computer-readable storage medium, such as memory 708 for instance, and may be executed by processor 706.

Exemplary Video-Game System

Figure 8:
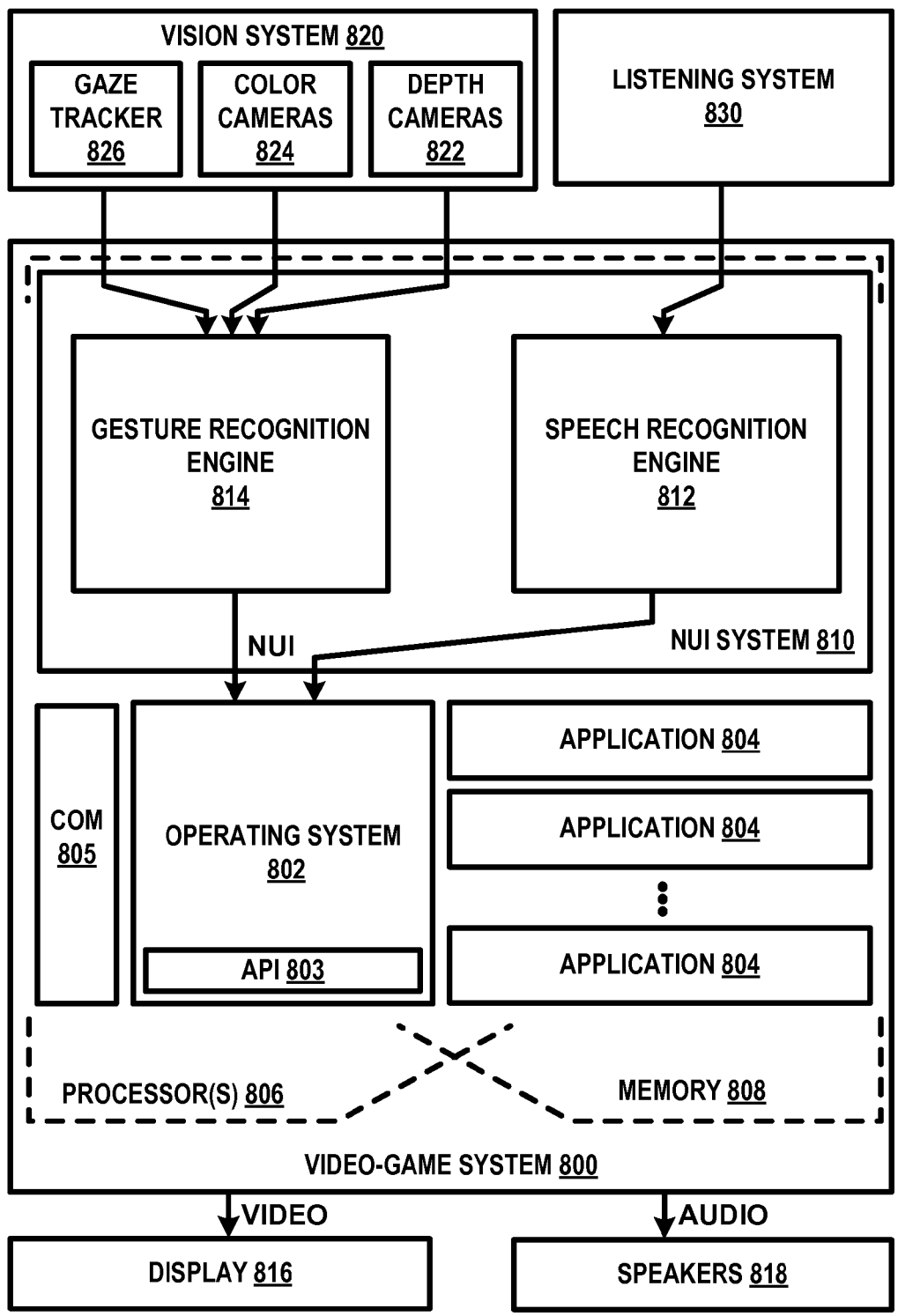
FIG. 8 illustrates an embodiment of an exemplary video-game system that may implement aspects of the described subject matter.

FIG. 8 illustrates a video-game system 800 as an embodiment of an exemplary video-game system that may implement aspects of the described subject matter. In one implementation, video-game system 800 may be an example of client computing device 610.

In some embodiments, video-game system 800 may be implemented as a combined multimedia and video-game system configured for searching, browsing, and playing various types of content including video-games, movies, and music.

Video-game system 800 includes operating system 802 (e.g., operating system 617 or other type of operating system) and various types of video-game system applications 804. In some implementations, video-game system application(s) 804 may include one or more of client application(s) 622 and/or may include one or more components of structured logging and instrumentation framework 620.

Video-game system 800 includes one or more physical devices configured to execute instructions, such as one or more processor(s) 806 configured to execute computer-executable instructions. Processor(s) 806 may be single-core or multi-core, and the instructions executed thereon may be configured for sequential, parallel and/or distributed processing.

Video-game system 800 includes one or more physical device configured to store instructions, such memory 808 implemented by computer-readable storage media. Memory 808 may include removable and/or built-in devices; optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Memory may include volatile, nonvolatile, dynamic, static, read/write, read-only, random-access, sequential-access, location-addressable, file-addressable, and/or content-addressable devices.

Aspects of processor(s) 806 and memory 808 may be integrated together into one or more hardware-logic components. Such hardware-logic components may include FPGAs, PASIC/ASICs, PSSP/ASSPs, a SoC, and CPLDs, for example.

Video-game system 800 may be configured to accept user input through various user-input devices (e.g., keyboard, mouse, touch-screen, gamepad, game controller, and the like). Video-game system 800 is also configured to accept natural user input (NUI) from one or more users and may include a NUI system 810 configured to mediate NUI from the one or more users.

NUI system 810 is configured to capture various aspects of NUI and provide corresponding actionable input to components of video-game system 800. NUI system may receive low-level input from peripheral sensory components such as vision system 820 and listening system 830. Vision system 820 detects visual input from the users and may include one or more depth cameras 822, one or more color cameras 824, and/or a gaze tracker 826. Listening system 830 may include one or more microphones to pick up vocalization and other audible input from one or more users and other sources in an environment. In various implementations, vision system 820 and listening system 830 may share a common enclosure; may be separate components, may be integrated within video-game system 800, and/or may be coupled to video-game system 800.

Depth cameras 822 may include an imaging system configured to acquire a time-resolved sequence of depth maps of one or more human subjects that it sights. Operationally, depth cameras 822 may be configured to acquire two-dimensional image data from which a depth map is obtained via downstream processing. Depth cameras 822 are able to resolve a contour of a human subject even if that subject is moving, and even if the motion of the subject (or any part of the subject) is parallel to the optical axis of the camera. This ability is supported, amplified, and extended through the dedicated logic architecture of NUI system 810.

Color cameras 824 may image visible light from the observed scene in a plurality of channels (e.g., red, green, blue, etc.) by mapping the imaged light to an array of pixels.

Alternatively, a monochromatic camera may be included, which images the light in grayscale. Color or brightness values for all of the pixels exposed in the camera constitute collectively a digital color image. Color and depth information may be assessed for each portion of an observed scene.

NUI system 810 processes low-level input (e.g., signals) from sensory components to provide actionable, high-level input to video-game system 800. For example, NUI system 810 may perform sound- or voice-recognition on audio signals from listening system 830. Such recognition may generate corresponding text-based or other high-level commands, which are received in the video-game system 800.

NUI system 810 includes a speech-recognition engine 812 and a gesture-recognition engine 814. Speech-recognition engine 812 is configured to: process audio data from listening system 830, recognize certain words or phrases in user speech, and generate corresponding actionable input to operating system 802 and/or video-game system applications 804.

Gesture-recognition engine 814 is configured to: process depth data from vision system 820, identify one or more human subjects in the depth data, compute various features of the subjects identified, and gather from the features gestural information used as NUI to operating system 802 or video-game system applications 804. Gesture-recognition application-programming interface (API) 803 is included in OS 802. Gesture-recognition API 803 offers callable code to provide actionable input for a plurality of processes running on the video-game system 800 based on a subject input gesture. Such processes may include application processes, operating system processes, and service processes, for example. In one embodiment, gesture-recognition API 803 may be distributed in a software-development kit (SDK) provided to application developers by the operating system maker.

Video-game system 800 includes a communication system 805 configured to communicatively couple NUI system 810 or video-game system 800 with one or more other computing devices over a network (e.g., network 630 and/or other type of network). Video-game system 800 also includes output devices including a display 816 and speakers 818.

In various implementations, components of video-game system 800 may be configured to perform various operations described in connection with client computing device 610, client application(s) 622, and/or other computing devices and/or applications. In one example embodiment, computer-executable instructions for performing such operations may be stored in a computer-readable storage medium, such as memory 808 for instance, and may be executed by processor(s) 806.

Exemplary Computing Environment

Figure 9:
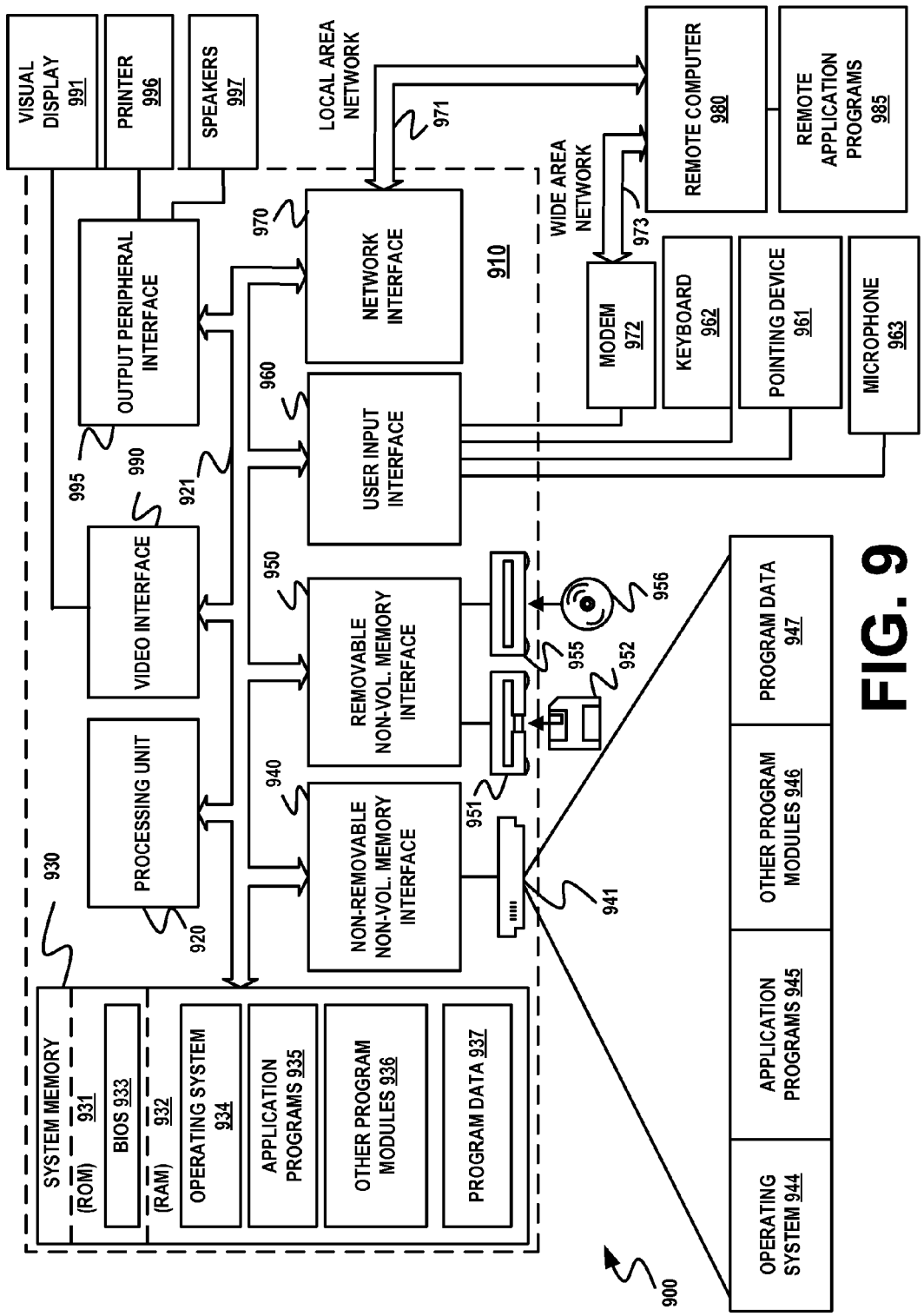
FIG. 9 illustrates an embodiment of an exemplary computing environment that may implement aspects of the described subject matter.

FIG. 9 illustrates a computing environment 900 as an embodiment of an exemplary computing environment that may implement aspects of the described subject matter. As shown, computing environment 900 includes a general-purpose computing device in the form of a computer 910. In various implementations, computer 910 may be an example of client computing device 610 and/or computer system 640.

Computer 910 may include various components that include, but are not limited to: a processing unit 920 (e.g., one or processors or type of processing unit), a system memory 930, and a system bus 921 that couples various system components including the system memory 930 to processing unit 920.

System bus 921 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

System memory 930 includes computer storage media in the form of volatile and/or nonvolatile memory such as ROM 931 and RAM 932. A basic input/output system (BIOS) 933, containing the basic routines that help to transfer information between elements within computer 910, such as during start-up, is typically stored in ROM 931. RAM 932 typically contains data and/or program modules that are immediately accessible to and/or presently being operated on by processing unit 920. By way of example, and not limitation, an operating system 934, application programs 935, other program modules 936, and program data 937 are shown.

Computer 910 may also include other removable/non-removable and/or volatile/nonvolatile computer storage media. By way of example only, FIG. 9 illustrates a hard disk drive 941 that reads from or writes to non-removable, nonvolatile magnetic media, a magnetic disk drive 951 that reads from or writes to a removable, nonvolatile magnetic disk 952, and an optical disk drive 955 that reads from or writes to a removable, nonvolatile optical disk 956 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. Hard disk drive 941 is typically connected to system bus 921 through a non-removable memory interface such as interface 940, and magnetic disk drive 951 and optical disk drive 955 are typically connected to system bus 921 by a removable memory interface, such as interface 950.

Alternatively, or in addition, the functionality described herein can be performed, at least in part, by one or more hardware logic components. For example, and without limitation, illustrative types of hardware logic components that can be used include FPGAs, PASIC/ASICs, PSSP/ASSPs, a SoC, and CPLDs, for example.

The drives and their associated computer storage media discussed above and illustrated in FIG. 9, provide storage of computer readable instructions, data structures, program modules and other data for the computer 910. For example, hard disk drive 941 is illustrated as storing operating system 944, application programs 945, other program modules 946, and program data 947. Note that these components can either be the same as or different from operating system 934, application programs 935, other program modules 936, and program data 937. Operating system 944, application programs 945, other program modules 946, and program data 947 are given different numbers here to illustrate that, at a minimum, they are different copies.

A user may enter commands and information into the computer 910 through input devices such as a keyboard 962, a microphone 963, and a pointing device 961, such as a mouse, trackball or touch pad. Other input devices (not shown) may include a touch screen joystick, game pad, satellite dish, scanner, or the like. These and other input devices are often connected to the processing unit 920 through a user input interface 960 that is coupled to the system bus, but may be connected by other interface and bus structures, such as a parallel port, game port or a universal serial bus (USB).

A visual display 991 or other type of display device is also connected to the system bus 921 via an interface, such as a video interface 990. In addition to the monitor, computers may also include other peripheral output devices such as speakers 997 and printer 996, which may be connected through an output peripheral interface 995.

Computer 910 is operated in a networked environment using logical connections to one or more remote computers, such as a remote computer 980. Remote computer 980 may be a personal computer, a hand-held device, a server, a router, a network PC, a peer device or other common network node, and typically includes many or all of the elements described above relative to the computer 910. The logical connections depicted include a local area network (LAN) 971 and a wide area network (WAN) 973, but may also include other networks. Such networking environments are commonplace in offices, enterprise-wide computer networks, intranets and the Internet.

When used in a LAN networking environment, computer 910 is connected to LAN 971 through a network interface or adapter 970. When used in a WAN networking environment, computer 910 typically includes a modem 972 or other means for establishing communications over the WAN 973, such as the Internet. Modem 972, which may be internal or external, may be connected to system bus 921 via user input interface 960, or other appropriate mechanism. In a networked environment, program modules depicted relative to computer 910, or portions thereof, may be stored in a remote memory storage device. By way of example, and not limitation, remote application programs 985 as shown as residing on remote computer 980. It will be appreciated that the network connections shown are exemplary and other means of establishing a communications link between the computers may be used.

The detailed description provided above in connection with the appended drawings is intended as a description of examples and is not intended to represent the only forms in which the present examples may be constructed or utilized.

It is to be understood that the configurations and/or approaches described herein are exemplary in nature, and that the described embodiments, implementations and/or examples are not to be considered in a limiting sense, because numerous variations are possible. The specific processes or methods described herein may represent one or more of any number of processing strategies. As such, various operations illustrated and/or described may be performed in the sequence illustrated and/or described, in other sequences, in parallel, or omitted. Likewise, the order of the above-described processes may be changed.

Although the subject matter has been described in language specific to structural features and/or methodological acts, it is to be understood that the subject matter defined in the appended claims is not necessarily limited to the specific features or acts described above. Rather, the specific features and acts described above are presented as example forms of implementing the claims.

What is claimed is:

1. A computer-implemented method comprising:
   implementing, by a computing device, a structured logging service;
   exposing, by the structured logging service, a structured logging application programming interface (API) that implements trace event parameters;
   receiving a call to the structured logging API from an instrumentation point that is implemented within an application, the call supplying trace event arguments for the trace event parameters, wherein:
      the structured logging API does not support receiving a print-formatted string for the trace event arguments, and
      the trace event arguments include a label argument for passing in a text-only message string and a structured payload containing one or more strongly-typed key-value pairs;
   capturing structured trace event information based on the trace event arguments supplied in the call;
   outputting, to a rules engine, a portion of the structured trace event information that corresponds to the structured payload as the one or more strongly-typed key-value pairs, wherein the rules engine is configured to apply consumption rules to the one or more strongly-typed key-value pairs for targeting certain items of the structured trace information; and
   outputting, to a disk sink, the portion of the structured trace event information that corresponds to the structured payload as the text-only message string corresponding to the label argument followed by a serialized string of the one or more strongly-typed key-value pairs, wherein the disk log sink is configured to write the text-only message and the serialized string to a message data field of a trace log.

2. The computer-implemented method of claim 1, wherein the trace event parameters implemented by the structured logging API include: a trace tag parameter that accepts a trace tag ID for a trace event, a trace category parameter that accepts a category name or category ID for the trace event, and a trace severity parameter that accepts a severity level for the trace event.

3. The computer-implemented method of claim 1, wherein the call to the structured logging API explicitly declares a structured data type that is supported by the rules engine for each of the one or more strongly-typed key-value pairs.

4. The computer-implemented method of claim 3, wherein:
   the structured data type declared for the one or more strongly-typed key-value pairs is a StructuredString, a StructuredBool, or a StructuredInt; and
   the serialized string is output to the disk log sink is in a JavaScript Object Notation (JSON) format that is both human-readable and machine-readable.

5. The computer-implemented method of claim 1, wherein the serialized string is in JavaScript Object Notation (JSON) format.

6. The computer-implemented method of claim 5, wherein:
   the text-only message is a developer-defined static description of a trace event to be reviewed in the trace log.

7. The computer-implemented method of claim 1, further comprising:
   outputting the one or more strongly-typed key-value pairs to the rules engine to provide dynamic telemetry collection for the application.

8. The computer-implemented of claim 7, wherein:
   the rules engine is configured to receive the consumption rules from a rules service over a network.

9. The computer-implemented method of claim 8, wherein:

the the consumption rules specify a calculation to be performed by the rules engine on the one or more strongly-typed key-value pairs.

10. The computer-implemented method of claim 8, wherein:
the rules engine is configured to generate rule results by applying the consumption rules to strongly-typed key-value pairs supplied by multiple instrumentation points, and
the rules engine is configured to send the rule results to the rules service as telemetry data.

11. A computing device comprising:
a processor for executing computer-executable instructions; and
memory storing computer-executable instructions configured to:
expose a structured logging application programming interface (API) that implements trace event parameters;
receive a call to the structured logging API from an instrumentation point implemented by an application, the call supplying trace event arguments for the trace event parameters, wherein:
the structured logging API does not support receiving a print-formatted string for the trace event arguments, and
the trace event arguments include a label argument for passing in a text-only message string and a structured payload including one or more strongly-typed key-value pairs;
capture structured trace information based on the trace event arguments supplied in the call;
output, to a rules engine, a portion of the structured trace event information that corresponds to the structured payload as the one or more strongly-typed key-value pairs, wherein the rules engine is configured to apply consumption rules to the one or more strongly-typed key-value pairs for targeting certain items of the structured trace information; and
output, to a disk sink, the portion of the structured trace event information that corresponds to the structured payload as the text-only message string corresponding to the label argument followed by a serialized string of the one or more strongly-typed key-value pairs, wherein the disk sink is configured to write the text-only message and the serialized string to a message data field of a trace log.

12. The computing device of claim 11, wherein the trace event parameters implemented by the structured logging API include: a trace tag parameter that accepts a trace tag ID for a trace event, a trace category parameter that accepts a category name or category ID for the trace event, and a trace severity parameter that accepts a severity level for the trace event.

13. The computing device of claim 11, wherein the structured logging API requires an explicitly declared structured data type that is supported by the rules engine for each of the one or more strongly-typed key-value pairs.

14. The computing device of claim 11, wherein:
the structured data type declared for the one or more strongly-typed key-value pairs is a StructuredString, a StructuredBool, or a StructuredInt; and
the serialized string is output to the disk log sink is in a JavaScript Object Notation (JSON) format that is both human-readable and machine-readable.

15. The computing device of claim 11, wherein the memory further stores computer-executable for:

outputting the one or more strongly-typed key-value pairs to the rules engine to target telemetry data in the strongly-typed key-value pairs and perform a calculation on the telemetry data for generating a rule result.

16. A computer-readable storage medium storing computer-executable instructions that, when executed by a processor of a computing device, cause the computing device to perform a method comprising:
exposing, by a structured logging service, a structured logging application programming interface (API) that implements trace event parameters, the structured logging API including a function for sending structured trace event information;
receiving a call to the function from an instrumentation point that is implemented within source code of an application, the call supplying trace event arguments for the trace event parameters, wherein:
the structured logging API does not support receiving a print-formatted string as a trace event argument, and
the trace event arguments include a label argument for passing in a text-only message string and a structured payload containing a series of strongly-typed key-value pairs;
capturing structured trace information based on the trace event arguments supplied in the call;
outputting, to a rules engine, a portion of the structured trace event information that corresponds to the structured payload as the series of strongly-typed key-value pairs, wherein the rules engine is configured to apply consumption rules to the strongly-typed key-value pairs for targeting certain items of the structured trace information; and
outputting, to a disk sink, the portion of the structured trace event information that corresponds to the structured payload as the text-only message string corresponding to the label argument followed by a serialized string of the strongly-typed key-value pairs, wherein the disk log sink is configured to write the text-only message and the serialized string to a message data field of a trace log.

17. The computer-readable storage medium of claim 16, further storing computer-executable instructions for:
implementing the rules engine to extract targeted items of telemetry data from the strongly-typed key-value pairs and perform a calculation on the telemetry data for generating a rule result.

18. The computer-readable storage medium of claim 17, wherein the structured logging API declares structured data types that are supported by the rules engine for the strongly-typed key-value pairs.

19. The computer-readable storage medium of claim 18, wherein:
the structured data types declared for the strongly-typed key-value pairs include StructuredString, a StructuredBool, or a StructuredInt; and
the serialized string is output to the disk log sink is in a JavaScript Object Notation (JSON) format that is both human-readable and machine-readable.

20. The computer-readable storage medium of claim 17, wherein the structured logging API is overloaded to support a range of numbers of strongly-typed key-value pairs.

* * * * *